US010257256B2

(12) United States Patent
Schilit et al.

(10) Patent No.: US 10,257,256 B2
(45) Date of Patent: Apr. 9, 2019

(54) IOT INTERACTION SYSTEM

(71) Applicant: Google Inc., Mountain View, CA (US)

(72) Inventors: William Noah Schilit, Mountain View, CA (US); Roy Want, Los Altos, CA (US)

(73) Assignee: Google LLC, Mountain View, CA (US)

(*) Notice: Subject to any disclaimer, the term of this patent is extended or adjusted under 35 U.S.C. 154(b) by 481 days.

(21) Appl. No.: 15/001,813

(22) Filed: Jan. 20, 2016

(65) Prior Publication Data

US 2017/0208116 A1    Jul. 20, 2017

(51) Int. Cl.
*G06F 3/0482* (2013.01)
*H04L 29/08* (2006.01)
*G06F 3/0484* (2013.01)
*H04W 48/04* (2009.01)
*G01S 5/00* (2006.01)
*H04W 64/00* (2009.01)

(52) U.S. Cl.
CPC .......... *H04L 67/025* (2013.01); *G06F 3/0482* (2013.01); *G06F 3/0484* (2013.01); *H04L 67/12* (2013.01); *H04W 48/04* (2013.01); *G01S 5/00* (2013.01); *H04W 64/00* (2013.01)

(58) Field of Classification Search
CPC combination set(s) only.
See application file for complete search history.

(56) References Cited

U.S. PATENT DOCUMENTS 9,763,592 B2 *   9/2017  Le .................. A61B 5/0482
10,054,911 B2 *  8/2018  Scheckelhoff ....... H04L 12/282
10,116,760 B2 * 10/2018  Chan ..................... H04W 4/023
2013/0132833 A1 * 5/2013  White ..................... G06F 3/048
                                                        715/704
2014/0032630 A1    1/2014  Igoe
2014/0173446 A1 * 6/2014  Lee ....................... H04L 41/22
                                                        715/736

(Continued)

FOREIGN PATENT DOCUMENTS

WO    WO 2014128594    8/2014
WO    WO 2015104248    7/2015

OTHER PUBLICATIONS

PCT International Search Report based off PCT Application No. PCT/US2016/065290, dated Mar. 14, 2017—4 pages.

*Primary Examiner* — Hien L Duong
(74) *Attorney, Agent, or Firm* — Dority & Manning, P.A.

(57) ABSTRACT

Systems and methods for facilitating interactions with embedded devices are provided. In one embodiment, a method can include obtaining a first set of data indicative of at least a plurality of interactions between a user device and a plurality of embedded devices associated with a building, and one or more locations of the user device associated with each respective interaction. The method can include generating a second set of data for each embedded device based, at least in part, on the first set of data. Each second set of data can be indicative of at least a number of interactions between the user device and the respective embedded device for each location. The method can include determining a particular location of the user device. The method can include identifying one or more recommended embedded devices and providing information about at least one recommended embedded device to the user device.

19 Claims, 10 Drawing Sheets

(56) References Cited

U.S. PATENT DOCUMENTS

| | | | |
|---|---|---|---|
| 2014/0365018 A1* | 12/2014 | Kusukame | G05D 23/1917 |
| | | | 700/276 |
| 2015/0169694 A1* | 6/2015 | Longo | H04W 4/21 |
| | | | 707/724 |
| 2015/0256954 A1 | 9/2015 | Carlsson et al. | |
| 2016/0195859 A1* | 7/2016 | Britt | G05B 15/02 |
| | | | 700/275 |
| 2016/0198536 A1* | 7/2016 | Britt | H02J 7/0042 |
| | | | 315/149 |
| 2016/0226732 A1* | 8/2016 | Kim | H04L 12/2807 |
| 2017/0084143 A1* | 3/2017 | Acera | G08B 13/19684 |
| 2017/0169341 A1* | 6/2017 | Tang | G06N 5/04 |
| 2017/0206571 A1* | 7/2017 | Dhawan | G06Q 30/0281 |

* cited by examiner

IOT INTERACTION SYSTEM

FIELD

The present disclosure relates generally to facilitating interactions between a user device and embedded devices and, more particularly, to systems and methods that facilitate interactions between a user device and a plurality of embedded devices associated with a building through the use of device interaction data.

BACKGROUND

There is a proliferation of smart embedded devices such as sound speakers, home alarms, door locks, cameras, lighting systems, treadmills, weight scales, smart beds, irrigation systems, garage door openers, appliances, baby monitors, fire alarms, etc. These embedded devices can be located, for instance, within the confines of a building and an individual may desire to interact with such embedded devices. To do so, the individual may use a mobile device (e.g., a remote) to wirelessly communicate with the embedded devices. For example, an individual may interact with a security system via a mobile device to adjust a security camera of a building.

Given the proliferation of embedded devices, an individual seeking to interact with an embedded device may be presented with a list of dozens of embedded devices, only a subset of which may be desirable for a particular interaction. Some technologies aim to solve this problem by detecting the presence of an individual within a room through the use of passive infrared room occupancy detectors. In such cases, the individual may be presented with a list of devices located in the room occupied by that individual. However, these technologies involve binary detectors and coarse-grain location techniques, which can lead to the omission of relevant embedded devices.

SUMMARY

Aspects and advantages of embodiments of the present disclosure will be set forth in part in the following description, or may be learned from the description, or may be learned through practice of the embodiments.

One example aspect of the present disclosure is directed to a method of facilitating interactions with embedded devices. The method can include obtaining, by one or more computing devices, a first set of data indicative of at least a plurality of interactions between a user device and a plurality of embedded devices associated with a building and one or more locations of the user device associated with each respective interaction. The method can further include generating, by the one or more computing devices, a second set of data for each embedded device of the plurality of embedded devices based at least in part on the first set of data. Each second set of data can be indicative of at least a number of interactions between the user device and the respective embedded device for each of the one or more locations. The method can include determining, by the one or more computing devices, a particular location of the user device. The method can further include identifying, by the one or more computing devices, one or more recommended embedded devices from the plurality of embedded devices based at least in part on the particular location of the user device and the second sets of data associated with the one or more recommended embedded devices. The method can include providing, by the one or more computing devices, information about at least one of the one or more recommended embedded devices to the user device.

Another example aspect of the present disclosure is directed to a computing system for facilitating interactions with embedded devices. The computing system can include one or more processors and one or more memory devices. The one or more memory devices can store computer-readable instructions that when executed by the one or more processors cause the one or more processors to perform operations. The operations can include obtaining a first set of data indicative of at least a plurality of interactions between a user device and a plurality of embedded devices associated with a building and one or more locations of the user device associated with each respective interaction. The operations can further include generating a second set of data for each embedded device of the plurality of embedded devices based at least in part on the first set of data. Each second set of data can be indicative of at least a number of interactions between the user device and the respective embedded device for the one or more locations. The operations can include creating one or more affordances for one or more of the locations based at least in part on the second sets of data. Each affordance can be associated with at least one of the one or more embedded devices. The operations can further include determining a particular location of the user device. The operations can include identifying one or more recommended embedded devices from the plurality of embedded devices based at least in part on the particular location of the user device and the one or more affordances. The operations can further include providing information about at least one of the one or more recommended embedded devices to the user device.

Yet another example aspect of the present disclosure is directed to a computer-implemented method of facilitating interactions with embedded devices. The method can include determining, by the one or more computing devices, one or more semantic locations associated with a first building. The method can further include obtaining, by the one or more computing devices, a first set of data indicative of at least a plurality of interactions between a first user device and a plurality of first embedded devices associated with the first building. The plurality of interactions can occur while the first user device is associated with one or more of the semantic locations. The method can include generating, by the one or more computing devices, a second set of data for each first embedded device based at least in part on the first set of data. Each second set of data can be indicative of at least a number of interactions between the first user device and the respective first embedded device for one or more of the semantic locations. The method can further include determining, by the one or more computing devices, a second location of a second user device associated with a second building. The method can include determining, by the one or more computing devices, whether the second location of the second user device is similar to one or more of the semantic locations associated with the first building. When the second location is similar to one or more of the semantic locations associated with the first building, the method can further include determining, by the one or more computing devices, one or more second recommended embedded devices of a plurality of second embedded devices associated with the second building based at least in part on one or more of the second sets of data. The method can include providing, by the one or more computing devices, information about at least one of the one or more second recommended embedded devices to the second user device.

Other example aspects of the present disclosure are directed to systems, apparatuses, tangible, non-transitory computer-readable media, user interfaces, memory devices, and electronic devices for facilitating interactions between a user device and embedded devices.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
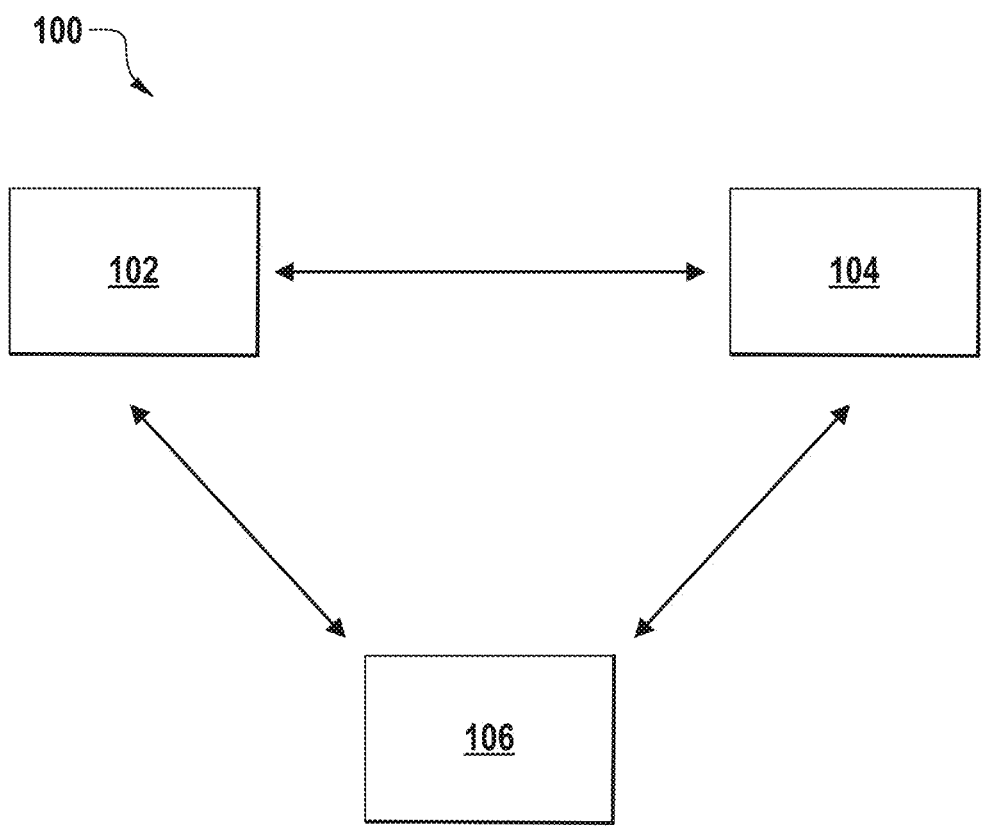
FIG. 1 depicts an example system for facilitating interactions with embedded devices according to example embodiments of the present disclosure.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to facilitating interactions between a user device and a plurality of embedded devices associated with a building. For instance, a user of a user device may desire to wirelessly communicate with certain embedded devices (e.g., thermostat, sound system, lighting systems, etc.) within a home to complete certain actions (e.g., adjust temperature, adjust volume, adjust lighting, etc.). To help facilitate such communications, a computing system can, over time, obtain data associated with the interactions between the user device and the embedded devices. Based on such data, the computing system can create a heat map for each embedded device that identifies the locations within the home at which the user device most frequently interacts with the respective embedded device. The computing system can use the heat maps to recommend certain embedded devices to the user device based on the location of the user device. For example, a heat map associated with an embedded whole-home sound system located in a utility closet can indicate that the user device frequently interacts with the sound system (e.g., to increase volume of certain speakers) when the user device is at a particular location within a living room. The particular location can, for example, happen to be near a physical object (e.g., a couch, a bed) where the user is typically located during interactions with the embedded device. Accordingly, when the user device is at the particular location, the computing system can communicate with the user device to recommend that the user device interact with the sound system. Based on past interactions, the computing system can also recommend a particular interaction with the embedded device, such as increasing the volume via the sound system.

More particularly, the computing system can obtain a first set of data indicative of a plurality of interactions between a user device and a plurality of embedded devices associated with the building. The term building, as used herein, can include a home, campus, mall airport, arena, structure(s), etc. The first set of data can also be indicative of one or more locations of the user device associated with each respective interaction. For example, for each interaction, the first set of data can indicate a location of the user device (e.g., at a location within the living room), an embedded device with which the user device interacted (e.g., a sound system), and a type-of-interaction (e.g., to increase volume).

The computing system can generate a second set of data for each embedded device based, at least in part, on the first set of data. The second set of data can be indicative of at least a number of interactions between the user device and the respective embedded device for each location of the user device. In some implementations, the second set of data can include a heat map indicative of the number of interactions between the user device and the respective embedded device for each location within the building relative to the other locations within the building. The number of interactions can include a number of past interactions between the user device and the respective embedded device. For example, a heat map associated with a sound system can indicate that the user device frequently interacts with the sound system (e.g., to increase volume) while at a location in the living room (e.g., at a location near a couch) and a location in the bedroom. In another example, a heat map associated with a security system can indicate that the user device frequently interacts with the security system (e.g., to set an alarm of the building) while at a location in a bedroom (e.g., at a location near a bed) and the entry hallway.

The computing system can then determine a particular location (e.g., a current location) of the user device by communicating with the user device. The present disclosure can include a fine-grained user device locating process to determine a precise location of the user device within and/or outside the building (e.g., at a particular location within a living room, bedroom, porch, etc.). Such process can include, for instance, transmitting communications that comply with one of the Institute of Electrical and Electronics Engineers (IEEE) 802.11mc or 802.15.4a standards and/or other location techniques.

For example, in some implementations, the user device can determine its own location by communicating with a plurality of self-organizing beacon devices. For instance, to initiate a user device locating process, the user device can send a first signal (e.g., ultrasonic pulses) to a plurality of beacon devices. The plurality of beacon devices can be located throughout the building. Each beacon device can be configured to self-locate by, for example, communicating among the plurality of beacon devices. The beacon devices can use one or more beacon locating signals (e.g., ultra-wide band signals) to determine its location within the building. In response to the first signals, two or more of the beacon devices can send a plurality of second signals (e.g., RF signal, Bluetooth low energy packets) to the user device. The second signals can include the location of the beacon device, which was determined by the beacon device by sending and receiving the one or more beacon-locating signals. The user device can determine its location based, at least in part, on the locations of the two or more beacon devices that sent the second signals. The user device can communicate its location to the computing system.

In some other implementations, the user device can determine its particular location by utilizing Wi-Fi round trip time (RTT) calculations. For instance, the user device can initiate a location finding process by sending a signal to a plurality of access points. The access points can send one or more response signals to the user device. The response signals can include data indicative of a time delay (e.g., processing delay) between when the respective access point received the initiating signal and sent the response signals. The user device can calculate the times-of-flight associated with the initiating signals and/or response signals based, at least in part, on the time at which the user device sent the initiating signals, the time at which the user device received the response signals, and/or the time delay associated with an access point. If the user device receives response signals from three or more access points, the user device can apply trilateration techniques to the determined distances and locations to locate itself relative to the access points. For example, the user device can determine that it is at a particular location within an area (e.g., at a location near a couch of the living room). The user device can then send data indicative of its particular location to the computing system. Thus, the computing system can determine the location of the user device by communicating with the user device.

The computing system can identify one or more recommended embedded devices based, at least in part, on the particular location of the user device and the second sets of data (indicating which embedded devices frequently interact with the user device at its particular location). The recommended embedded devices can include, for instance, the embedded devices associated with the highest number of interactions with the user device, while the user device is at its particular location.

For example, the computing system can determine that the user device is at (e.g., near, in the vicinity of) a particular location within a living room (e.g., at a location near a couch). Based, at least in part on the heat maps, the computing system can identify the sound system as a recommended device for interacting with speakers while the user device is at the particular location within the living room.

The computing system can also identify one or more recommended devices based on one or more affordances. For example, based on the second sets of data, the computing system can create one or more affordances for a location within a building (e.g., at a location near a bed in the master bedroom). Each of the affordances can be associated with an embedded device. For instance, the location near the bed can have an affordance for interacting with the security system and another affordance for interacting with the thermostat. When the computing system determines that the user device is at the location near the bed, it can recommend the embedded devices associated with the affordances (e.g., the security system, the thermostat).

The computing system can provide information about at least one recommended embedded device to the user device. In some implementations, the information can include a list of the one or more recommended embedded devices. The list can include at least the recommended embedded devices associated with the highest number of interactions for the particular location.

Additionally, and/or alternatively, the computing system can determine one or more recommended interactions for each of the recommended embedded devices. For instance, based on the first set of data, the location of the user device, a time of day, etc. the computing system can determine the typical types of interactions between the user device and the recommended embedded devices when the user device is at a particular location. For example, the computing system can determine that the user device typically interacts with the security system to set an alarm of the building when the user device is at a particular location in the bedroom at night.

The computing system can provide one or more recommended interactions (e.g., to set an alarm) associated with a recommended device (e.g., security system) to the user device. For example, in some implementations, the list of recommended embedded devices can also include one or more recommended interactions for each respective embedded device. The user device can display the list via a user interface and allow a user to interact with the recommended embedded devices (e.g., via links, applications) to implement a recommended interaction. In other implementations, the computing device and/or user device can automatically implement a recommended interaction without user input.

In some implementations, the computing system can be configured to recommend one or more embedded devices to a user device based, at least in part, on the user device-embedded device interactions that occur in other, separate buildings. For example, the computing system can use a first set of data (indicative of the interactions between a first user device and first embedded devices) associated with one building to make recommendations to second user device associated with another, separate building.

For instance, the computing system can determine one or more semantic locations (e.g., den, living room, dining room, bedroom, hallway, foyer, kitchen, porch, etc.) within a first building by communicating with the first embedded devices. More specifically, in some implementations, when the embedded devices are installed, an installer can identify the semantic location of the device (e.g., via a dropdown menu, manual input). For instance, the area in which a smart television is installed can be identified as the living room by the installer. The embedded device can store the semantic location in a memory device and provide the semantic location to the computing system. For each semantic location, the computing system can determine one or more first recommended embedded devices based, at least in part, on the heat maps associated with the first embedded devices.

The computing system can determine the location of a second user device associated with a second building. The computing system can then determine whether the location of the second user device is similar to one or more of the semantic locations associated with the first building. For instance, using the location finding process described above, the computing system can determine that the second user device is at a particular location within the living room of the second building and then determine that such location is similar to a semantic location (e.g., living room) of the first building.

Given the similarity, the computing system can determine one or more second recommended embedded devices associated with the second building. For example, the computing system can recommend that the second user device interact with a thermostat, a sound system, and/or a lighting system of the second building because the thermostat, sound system, and/or lighting system of the first building were recommended embedded devices for the first user device while in the living room of the first building.

Further to the descriptions above, a user may be provided with controls allowing the user to make an election as to both if and when systems, programs or features described herein may enable collection of user information (e.g., information about a user's social network, social actions or activities, a user's preferences, or a user's current location), and if the user is sent content or communications from the computing system. In addition, certain data may be treated in one or more ways before it is stored or used, so that personally identifiable information is removed. For example, a user's identity may be treated so that no personally identifiable information can be determined for the user. Thus, the user may have control over what information is collected about the user, how that information is used, and what information is provided to the user.

In such fashion, the apparatuses, systems, and methods of the present disclosure can facilitate the interactions between a user device and a plurality of embedded devices through the use of fine-grained location techniques. Moreover, the present disclosure utilizes device interaction data to more knowledgeably recommend embedded devices based on a user device's location. Accordingly, the systems and methods of the present disclosure can help streamline the interactions between a user device and embedded devices, making such interactions more user-friendly and convenient.

With reference now to the Figures, example aspects of the present disclosure will be discussed in more detail. For instance, FIG. 1 depicts an example system 100 for facilitating interactions with embedded devices according to example embodiments of the present disclosure. In particular, system 100 can include one or more user devices 102, a plurality of embedded devices 104, and a computing system 106.

User device 102 can be a mobile computing device, a device associated with a user, a phone, a smart phone, a computerized watch (e.g., a smart watch), computerized eyewear, computerized headwear, other types of wearable computing devices, a tablet, a personal digital assistant (PDA), a laptop computer, a desktop computer, a gaming system, a media player, a remote control, an e-book reader, a television platform, a navigation system, a digital camera, an appliance, or any other type of mobile and/or non-mobile computing device that is configured to perform the operations and functions as described herein. User device 102 can be configured to communicate with other devices. For instance, user device 102 can be configured to communicate with embedded devices 104 and/or computing system 106 over a wired and/or wireless network.

Embedded devices 104 can include a thermostat, sound system, security system, lighting system, door lock, camera, fitness tracker, weight scale, smart bed, irrigation system, garage door opener, appliance, baby monitor, cleaning robot, smart doorbell, kitchen scale, fire alarm, and/or any other embedded device. Each embedded device 104 can be configured to control, change, monitor, and/or adjust a condition, parameter, device, and/or system associated with a building.

For example, embedded devices 104 can include a surround-sound system that can be configured to adjust the sound properties (e.g., volume, treble, bass) associated with one or more speakers located throughout the building. In another example, embedded devices 104 can include a thermostat configured to adjust the temperature of the building via an HVAC system. In another example, embedded devices 104 can include a security system configured to activate and/or deactivate an alarm and/or lock the building. In yet another example, embedded devices 104 can include a lighting system configured to control one or more lights located throughout the building.

User device 102 can be configured to interact with embedded devices 104 (e.g., over a network) to complete certain actions associated with embedded devices 104. For example, in the event that embedded devices 104 include a sound system, user device 102 can be configured to communicate with embedded devices 104 to adjust the volume of one or more speakers via the sound system. In another example, in the event that embedded devices 104 include a thermostat, user device 102 can be configured to communicate with embedded devices 104 to adjust the temperature of the building via the thermostat.

Computing system 106 can be implemented using one or more computing devices, such as, for example, one or more servers. Computing system 106 can include, for example, a cloud service (e.g., that user device 102 connect to over WiFi, LTE, etc.) and/or a server associated with a building (e.g., home). In some implementations, computing system 106 can include P2P networking where computing system 106 includes a distributed service running on user device 102 and uses a broadcast protocol over WiFi between them.

Computing system 106 can be configured to obtain data associated with the interactions between user device 102 and embedded devices 104 and recommend embedded devices to user device 102, as further described herein. For instance, computing system 106 can be configured to obtain a first set of data indicative of a plurality of interactions between user device 102 and embedded devices 104 associated with a building. The first set of data can be indicative of one or more locations of user device 102 associated with each respective interaction. For each interaction, the first set of data can indicate, for example, at least a location of a user device 102 (e.g., at a particular location in a living room of the building), an embedded device with which the user device interacted (e.g., a sound system), and a type-of-interaction (e.g., to increase volume).

Computing system 106 can be configured to generate a second set of data for each embedded device 104 based, at least in part, on the first set of data. The second set of data can be indicative of at least a number of interactions between user device 102 and the respective embedded device 104 for each location of user device 102. In some implementations, the second set of data can include a heat map indicative of the number of interactions between user device 102 and the respective embedded device 104 for each of the one or more locations within the building relative to the other locations within the building, as further described herein with reference to FIG. 6.

Computing system 106 can be configured to create one or more affordances for one or more locations associated with a building. The one or more affordances can be based, at least in part, on the second sets of data and each affordance can be associated with at least one embedded device. For example, computing system 106 can create one or more affordances for a location within a living room of a building (e.g., at a location near a couch). One affordance can be associated with interacting with a sound system, while another affordance can be associated with interacting with a lighting system. Computing system 106 can create these affordances based, for example, on the number of interactions between user device 102 and embedded devices 104 while user device 102 is at the location within the living room.

Computing system 106 can be configured to determine a particular location of user device 102. The particular location can be the current location of user device 102 within and/or outside a building. For instance, user device 102 can communicate (e.g., periodically, continuously, upon request) its particular location to computing system 106. As further described with reference to FIGS. 2 and 3, in one example, user device 102 can determine its particular location by communicating with a plurality of beacon devices. In another example, user device 102 can determine its location through RTT calculations.

Computing system 106 can be configured to identify one or more recommended embedded devices of the plurality of embedded devices 104. For instance, computing system 106 can be configured to identify one or more recommended embedded devices based, at least in part, on the particular location of user device 102, the second sets of data (e.g., indicating which embedded devices frequently interact with user device 102 at the particular location), and/or the one or more affordances. The recommended embedded devices can include, for instance, embedded devices 104 associated with the highest number of interactions with user device 102 while user device 102 is at a particular location.

By way of example, computing system 106 can be configured to determine that user device 102 is at a particular location within a living room (e.g., at a location near a couch). The particular location can be in the vicinity of one or more of the locations for which computing system 106 has created one or more affordances. Based, at least in part, on the second sets of data and the affordances, computing system 106 can identify the sound system as a recommended device for interacting with speakers to adjust volume while user device 102 is at the particular location within the living room (e.g., at a location near the couch).

Computing system 106 can be configured to provide information about at least one of the one or more recommended embedded devices to user device 102. In some implementations, the information can include a list of the one or more recommended embedded devices, as further described herein with reference to FIG. 7.

Computing system 106 can be configured to determine one or more recommended interactions for each of the recommended embedded devices. For instance, based on the first set of data, the particular location of user device 102, and/or a time of day, computing system 106 can determine the typical types of interactions between user device 102 and the recommended embedded devices when user device 102 is at a particular location. For example, computing system 106 can be configured to determine that user device 102 typically interacts with a security system to set an alarm when user device 102 is at a particular location in the bedroom (e.g., at a location near the bed) at night. Accordingly, computing system 106 can communicate with user device 102 to recommend that user device 102 interact with the security system to set the alarm of the building when user device 102 is at the particular location in the bedroom at night.

Additionally, and/or alternatively, computing system 106 can be configured to recommend one or more embedded devices to a user device based, at least in part, on the user device-embedded device interactions that occur in other, separate buildings. For instance, computing system 106 can be configured to use the first set of data (e.g., indicative of the interactions between user device 102 and embedded devices 104) and the second sets of data (e.g., heat maps) associated with embedded devices 104 to recommend one or more embedded devices of a second, separate building to another user device associated with the second building, as further described herein.

Figure 2:
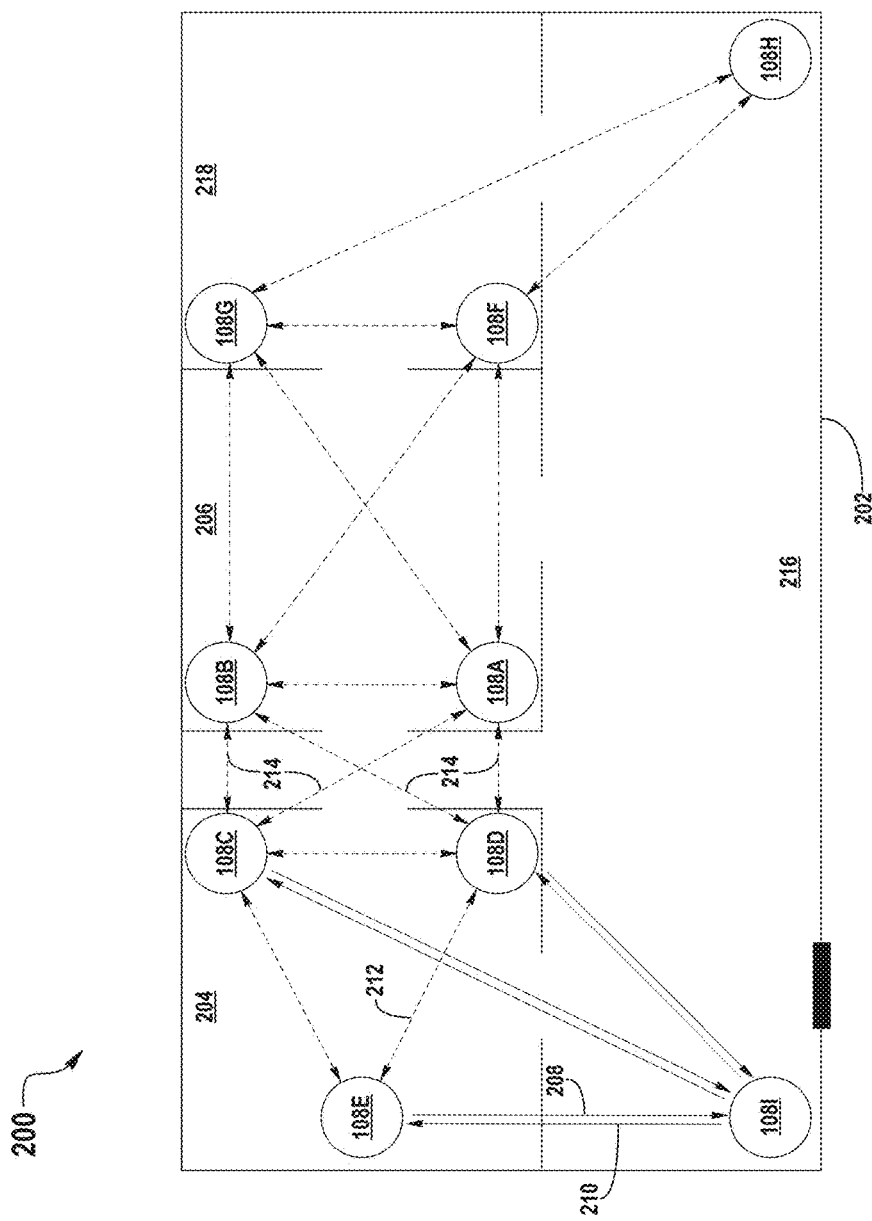
FIG. 2 depicts an example system for locating beacon devices according to example embodiments of the present disclosure.

FIG. 2 depicts an example system 200 for locating beacon devices according to example embodiments of the present disclosure. System 200 is only one example of a fine-grained location system that can be implemented in the present disclosure. In other implementations, techniques such as those complying with IEEE 802.11mc and other techniques can be utilized.

System 200 can include a plurality of beacon devices 108A-I associated with a building 202. Beacon devices 108 can be hardware devices that include one or more components to send and/or receive signals (e.g., ultra-wideband, radio frequency, Bluetooth low energy packets) to and/or from other devices. Beacon devices 108 can be a portion of a plurality of beacon devices spread throughout a space, such as a building (e.g., a home, a retail space, an office space, or any other type of enclosed facility). In some implementations, two or more beacon devices of the plurality of beacon devices 108A-I can be located within a common area (e.g., room) of the building 202. For instance, as shown in FIG. 2, a first beacon device 108A and a second beacon device 108B can both be associated with area 204 of building 202. Additionally and/or alternatively, beacon devices 108C-108E can be associated with area 204, beacon devices 108I-H can be associated with area 216, and/or beacon devices 108F-G can be associated with area 218. As indicated above, each of the plurality of beacon devices 108A-I can be configured to communicate among the plurality of beacon devices, for example, by sending and/or receiving beacon-locating (e.g., UWB) signals. The number(s) of beacon devices and/or areas shown within building 202 are depicted in FIG. 2 for purposes of illustration and discussion only and are not intended to be limiting.

The plurality of beacon devices 108A-I can include one or more anchor beacon devices 108I. While only anchor beacon device 108I is illustrated in FIG. 2, any of the plurality of beacon devices 108A-I can be an anchor beacon device and any number of anchor beacon devices can be used without deviating from the scope of the present disclosure. Anchor beacon device 108I can store a reference location and an existing coordinate system. The reference location can include a location that has been confirmed relative to the existing coordinate system. For instance, the reference location of anchor beacon device 108I can be a particular coordinate (e.g., latitude and longitude) associated with anchor beacon device 108I that has been confirmed relative to an existing coordinate system, such as a building map, blueprint, architectural plan, other data describing a floorplan of an interior of building 202, etc.

Anchor beacon device 108I can be configured to provide the reference location to one or more of the other beacon devices 108A-H. For instance, beacon device 108E can be deployed on a wall adjoining anchor beacon device 108I which can, for example, be placed in a corner of building 202, as shown for example in FIG. 2. Beacon device 108E can be configured to send one or more initial beacon-locating signals 208 (e.g., UWB signals) to anchor beacon device 108I. One or more initial beacon-locating signals 208 can include a request for information associated with anchor beacon device 108I. In response, anchor beacon device 108I can send one or more responsive beacon-locating signals 210 (e.g., UWB signals) to beacon device 108E. One or more responsive beacon-locating signals 210 can include information associated with anchor beacon device 108I, such as the reference location of anchor beacon device 108I (e.g., as a coordinate) and/or an existing coordinate system (e.g., a building map, data describing a floorplan of an interior of a building, etc.).

Beacon device 108E can be configured to receive one or more responsive beacon-locating signals 210 and calculate a time-of-flight associated with anchor beacon device 108I. In one example, beacon device 108E can determine a time-of-flight associated with one or more initial beacon-locating signals 208. Beacon device 108E can record the time at which it sent initial beacon-locating signals 208. Anchor beacon device 108I can record the time at which it received initial beacon-locating signals 208 and include such time in responsive signals 210. In this way, beacon device 108E can determine the time-of-flight associated with one or more initial beacon-locating signals 208 by determining a difference between the time at which beacon device 108E sent initial beacon-locating signals 208 and the time at which anchor beacon device 108I received initial beacon-locating signals 208. In another example, beacon device 108E can determine a time-of-flight associated with one or more responsive beacon-locating signals 210.

Beacon device 108E can be configured to determine its location. For instance, beacon device 108E can be configured to determine its location based, at least in part, on the time-of-flight associated with anchor beacon device 108I, the reference location of anchor beacon device 108I, and the fact that beacon device 108E is deployed on a wall adjoining anchor beacon device 108I.

Beacon devices 108A-H can be configured to send one or more beacon-locating signals among beacon devices 108A-H. Each of beacon devices 108A-H can be configured to include information associated with the specific beacon device 108A-H in the one or more beacon-locating signals. Such information can include, for example, an identification number associated with the beacon device, a name, environmental conditions around the beacon device (e.g., humidity, temperature, etc.), and/or a location within the building.

For instance, beacon device 108E can be configured to send one or more beacon-locating signals 212 to beacon device 108D. Beacon-locating signals 212 can include information associated with beacon device 108E and/or any other beacon device 108A-E. For instance, beacon-locating signals 212 can include a location of beacon device 108E and/or a location of anchor beacon device 108I. Beacon device 108D can be configured to determine its location based, at least in part, on beacon-locating signals 212 and/or other beacon-locating signals sent to and/or from beacon device 108D.

In a similar manner, each beacon device 108A-H can be configured to determine its respective location based on sending and/or receiving one or more beacon-locating signals among the plurality of beacon devices 108A-I. For instance, first beacon device 108A and second beacon device 108B can each be configured to determine its respective location by sending and/or receiving one or more beacon-locating signals 214 (e.g., that include information associated with one or more beacon device) among the plurality of beacon devices 108A-I.

Figure 3:
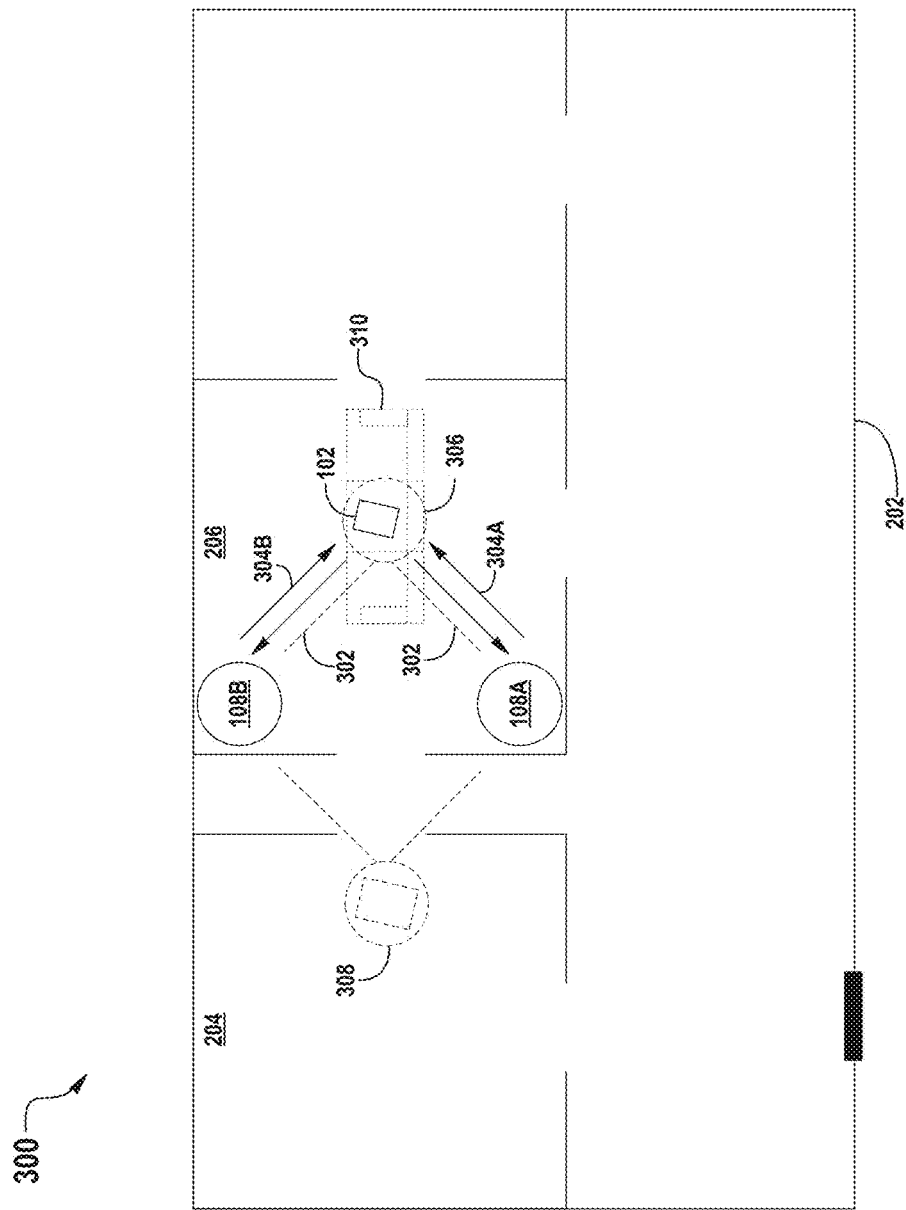
FIG. 3 depicts an example fine-grained user device location system according to example embodiments of the present disclosure.

FIG. 3 depicts an example fine-grained user device location system 300 according to example embodiments of the present disclosure. The system 300 can include at least two or more beacon devices 108A and 108B of a plurality of beacon devices, as well as user device 102. The at least two beacon devices 108A and 108B can be located within the same area 206. While FIG. 3 illustrates locating user device 102 while inside building 202, user device 102 can be located in an area outside of building 202.

To initiate a location finding process, user device 102 can be configured to send a first signal 302 to two or more beacon devices 108A, 108B. First signal 302 can, for instance, include ultrasonic pulses, which can be sent by an ultrasonic transmitter of user device 102. Beacon devices 108A, 108B can be configured to receive the first ultrasonic signal.

As indicated above with respect to FIG. 2, each beacon device 108A, 108B can be configured to communicate with the plurality of beacon devices 108A-I to determine its respective location within building 202, for example, by sending and/or receiving a plurality of beacon-locating signals.

Beacon devices 108A, 108B can be configured to send, to user device 102, a plurality of second signals 304A, 304B in response to first signal 302. In some implementations, second signals 304A, 304B can be radio frequency signals and can, for example, include Bluetooth low energy packets. Second signals 304A, 304B can include information associated with respective beacon devices 108A, 108B. For instance, second signals 304A, 308B can include data indicative of the location of beacon devices 108A, 108B (as determined via the beacon-locating signals), conditions associated with the environment around beacon devices 108A, 108B (e.g., humidity, temperature, etc.), a receipt time indicating a time at which beacon devices 108A, 108B received first signal 302, a transmission time indicating a time at which beacon devices 108A, 108B sent second signals 304A, 304B, and/or a time delay between when beacon devices 108A, 108B received first signal 302 and sent second signals 304A, 304B.

User device 102 can be configured to receive second signals 304A, 304B and to determine two or more times-of-flight respectively associated with the two or more beacon devices 108A, 108B. For instance, user device 102 can be configured to determine a time-of-flight associated with first signal 302 provided to beacon devices 108A, 108B. Additionally and/or alternatively, user device 102 can be configured to determine a time-of-flight associated with second signals 304A, 304B received by user device 102. In some implementations, user device 102 can be configured to determine a time-of-flight based, at least in part, on the times at which the first and/or second signals 302, 304A, 304B were transmitted and/or received by either user device 102 and/or beacon devices 108A, 108B. User device 102 can further be configured to determine a time-of-flight based, at least in part, on the conditions associated with the environment around beacon devices 108A, 108B and/or the time delay between when beacon devices 108A, 108B received first signal 302 and sent second signals 304A, 304B.

User device 102 can be configured to determine its location based, at least in part, on the times-of-flight associated with each of beacon devices 108A, 108B and the locations of beacon devices 108A, 108B. For example, user device 102 can be configured to use the respective times-of-flight determined for each of beacon devices 108A, 108B to determine the distance from beacon device 108A to user device 102 and the distance from beacon device 108B to user device 102. In some implementations, if user device 102 receives radio frequency signals from three or more beacon devices, user device 102 can apply trilateration techniques to the determined distances and locations to locate itself relative to the beacon devices.

However, in some implementations, only two beacon devices may be present within each area (e.g., area 206). In such implementations, user device 102 can be configured to determine at least two potential locations associated with user device 102. For instance, user device 102 can be configured to determine a first potential location 306 and a second potential location 308 based, at least in part, on the times-of-flight associated with each of beacon devices 108A, 108B and the locations of each of beacon devices 108A, 108B.

User device 102 can be configured to identify one of the potential locations as the actual location of user device 102. For instance, second signals 304A, 304B can include data indicative of a floorplan or layout of building 202 or other space. User device 102 can be configured to leverage the received data of the floorplan or layout of building 202 or other space to determine its location relative to beacon devices 108A, 108B. For instance, user device 102 can be configured to identify the first potential location 306 (e.g., at a location near couch 310) or the second potential location 308 as the actual location of user device 102 by determining which of the potential locations 306, 308 is associated with the same area 204 as beacon devices 108A, 108B. In FIG. 3, for example, first potential location 306 is associated with the same area 204 as beacon devices 108A, 108B, and thus, first potential location 306 (e.g., within area 204) can be identified as the location of user device 102.

Figure 4:
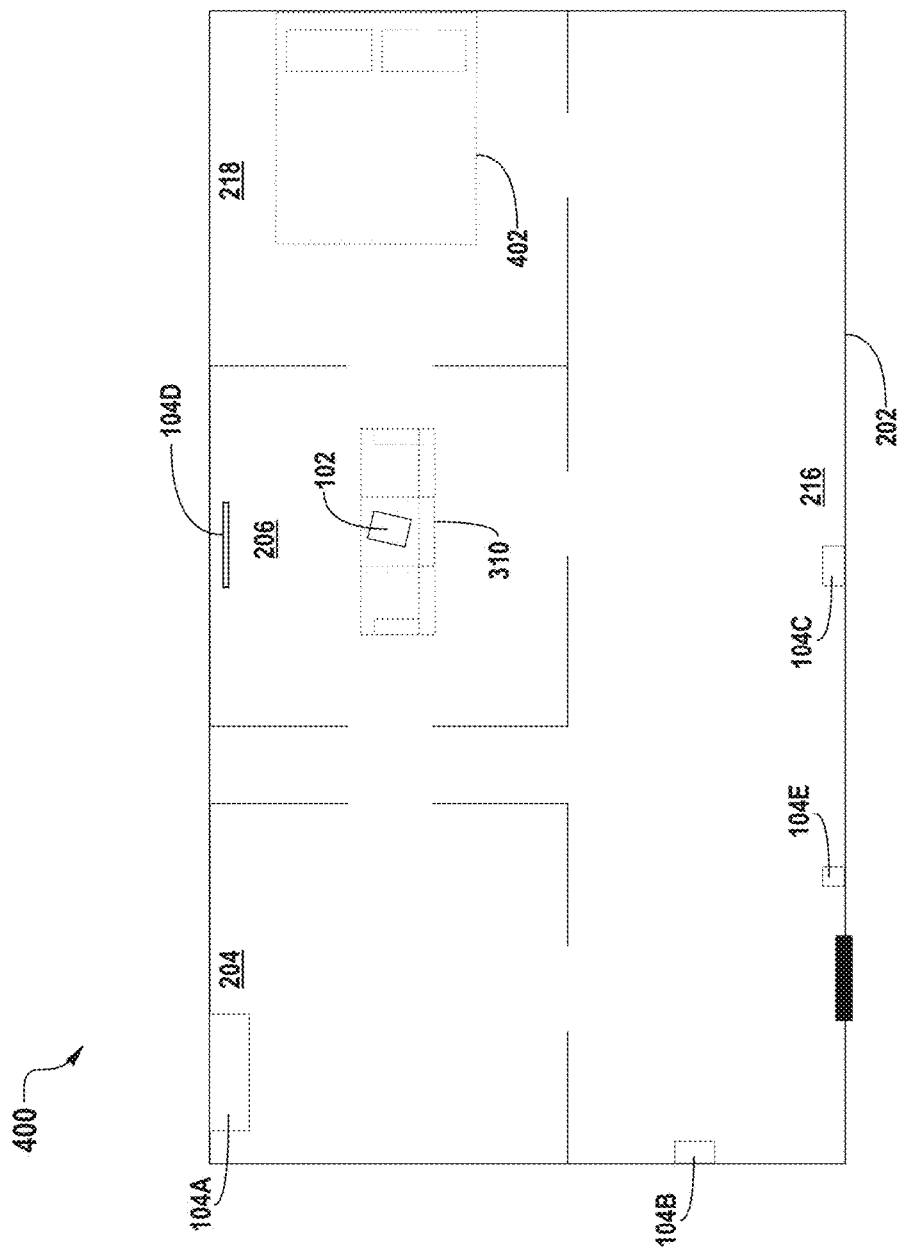
FIG. 4 depicts an example system according to example embodiments of the present disclosure.

FIG. 4 depicts an example system 400 according to example embodiments of the present disclosure. System 400 includes user device 102, a plurality of embedded devices 104A-E associated with building 202, and computing system 106 (not shown). Building 202 can include a plurality of areas 204, 206, 216, 218 and each area can, for instance, be associated with a separate room of building 202. For example, area 204 can be associated with den, area 206 can be associated with a living room (e.g., including couch 310), area 216 can be associated with a foyer, while area 218 can be associated with a bedroom (e.g., including bed 402). User device 102 can be located at a particular location within and/or outside building 202. For example, user device 102 can be located at a particular location within area 206 (e.g., a living room), near couch 310. In another example, user device 102 can be located at a particular location outside of building 202 such as on the front porch (e.g., at a location near a door).

The plurality of embedded devices 104A-E can be located within the areas 204, 206, 216, 218 of building 202 and/or located on the outside of building 202. Embedded device 104A can be located within area 204 and can be associated with a sound system. Embedded device 104B can be located in area 216 and can be associated with a thermostat. Embedded devices 104C and 104E can be located in area 216 and can be associated with a security system and a lighting system, respectively. Embedded device 104D can be located in area 206 and can be associated with a television. The number(s) and locations of embedded devices 104A-E shown within building 202 are depicted in FIG. 4 for purposes of illustration and discussion only and are not intended to be limiting.

Figure 5:
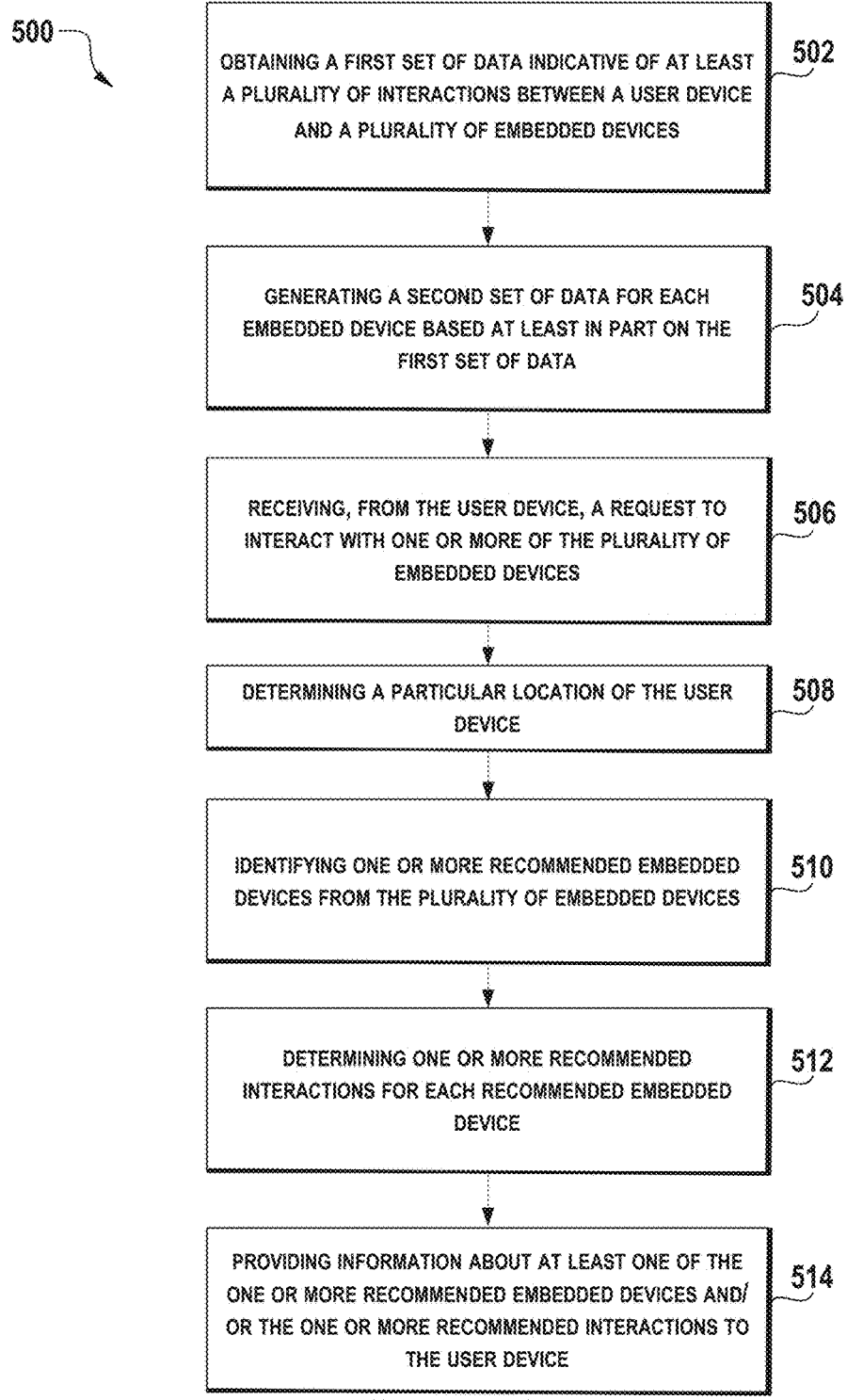
FIG. 5 depicts a flow diagram of an example method of facilitating interactions with embedded devices according to example embodiments of the present disclosure.

FIG. 5 depicts a flow diagram of an example method (500) of facilitating interactions with embedded devices according to example embodiments of the present disclosure. Method (500) can be implemented by one or more computing devices, such as one or more computing devices of computing system 106. In addition, FIG. 5 depicts steps performed in a particular order for purposes of illustration and discussion. The steps of any of the methods discussed herein can be adapted, rearranged, expanded, omitted, or modified in various ways without deviating from the scope of the present disclosure.

At (502), method (500) can include obtaining a first set of data indicative of at least a plurality of interactions between a user device and a plurality of embedded devices. For instance, computing system 106 can obtain a first set of data indicative of at least a plurality of interactions between user device 102 and embedded devices 104A-E associated with building 202. The first set of data can also be indicative of one or more locations of user device 102 associated with each respective interaction.

For example, computing system 106 can monitor the interactions between user device 102 and embedded devices 104A-E. Computing system 106 can obtain a first set of data that includes, for each interaction, one or more locations of user device 102 (e.g., at a location near couch 310 of area 206, at a location near bed 402 of area 218), the embedded device 104A-E with which user device 102 interacted (e.g., embedded device 104A, a sound system), and the type-of-interaction (e.g., to increase volume).

At (504), method (500) can include generating a second set of data from each embedded device based, at least in part, on the first set of data. For instance, computing system 106 can generate a second set of data for each embedded device of the plurality of embedded devices 104A-E based, at least in part, on the first set of data. Each second set of data can be indicative of at least a number of interactions between user device 102 and the respective embedded device 104A-E for each of the one or more locations. The second set of data can also, and/or alternatively, be based, at least in part, on a time of day, a day of week, and/or weather. In some implementations, each second set of data can include a heat map indicative of the number of interactions between user device 102 and the respective embedded device 104A-E for each location (associated with the interaction) relative to the other locations. The number of interactions can, for instance, include a number of one or more past interactions between user device 102 and embedded devices 104A-E.

Figure 6:
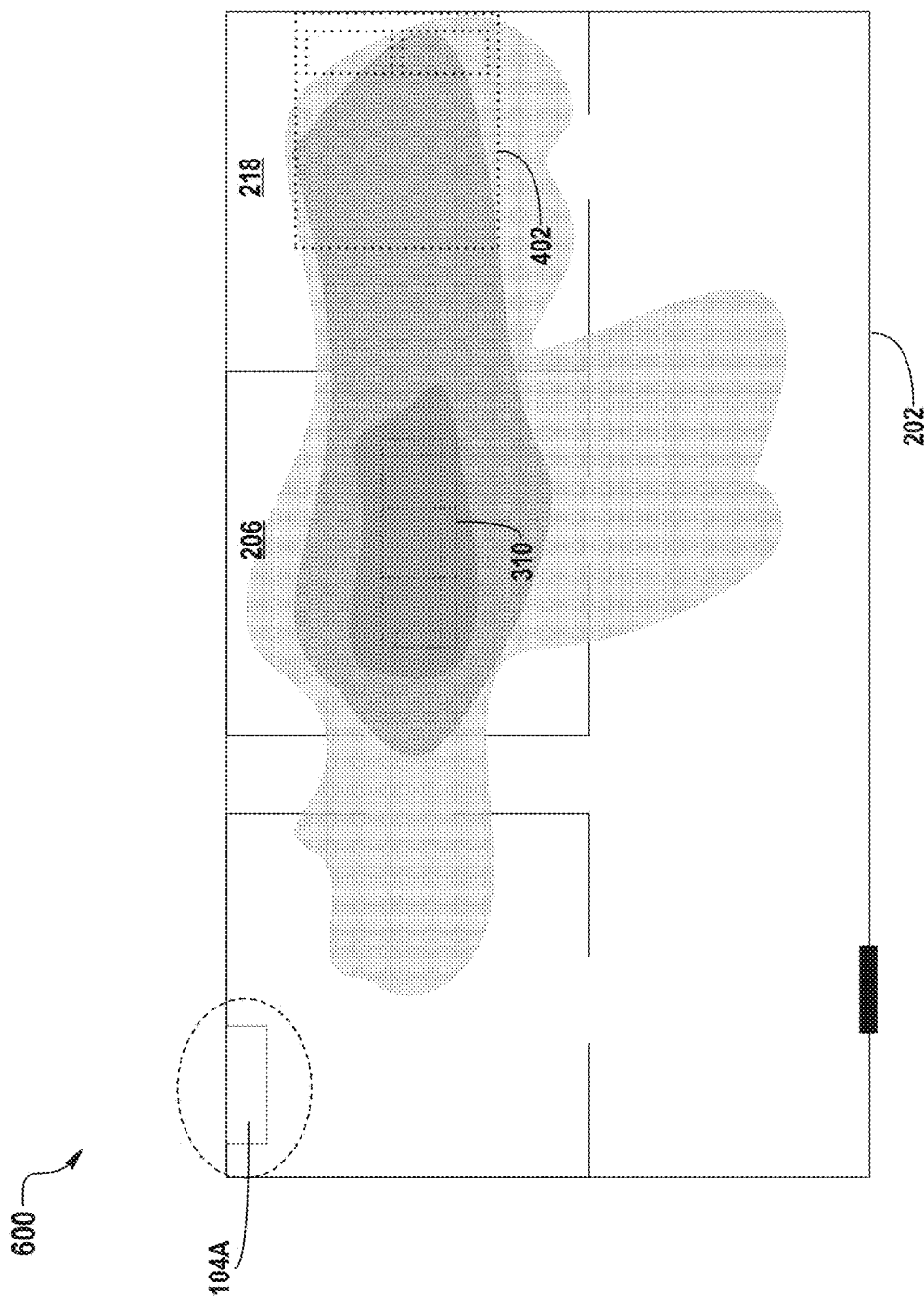
FIG. 6 depicts a heat map associated with an embedded device according to example embodiments of the present disclosure.

For example, FIG. 6 depicts a heat map 600 of embedded device 104A according to example embodiments of the present disclosure. Heat map 600 can be indicative of the number of interactions between user device 102 and embedded device 104A (e.g., a sound system) while user device 102 is located at various locations associated with building 202. Heat map 600 can indicate the number of interactions between user device 102 and embedded device 104A for each location at which user device 102 interacted with embedded device 104A relative to the other locations associated with building 202. For instance, as shown in FIG. 6, the darker portions of heat map 600 can indicate a higher number of interactions between user device 102 and embedded device 104A. Thus, heat map 600 can indicate that the highest number of interactions with embedded device 104A (e.g., a sound system) occur when user device 102 is at a particular location in area 206 (e.g., at a location near couch 310 in the living room) and/or at a particular location in area 218 (e.g., at a location near bed 402 in the bedroom). Additionally, and/or alternatively, a heat map can indicate the number of interactions between user device 102 and the respective embedded device 104A-E within a time period (e.g., within a day, week, month, year, etc.).

Referring back to FIG. 5, in some implementations, at (506), the method (500) can include receiving, from a user device, a request to interact with one or more of the plurality of embedded devices. For instance, computing system 106 can receive, from user device 102, a request to interact with one or more of the plurality of embedded devices 104A-E. The request can, for instance, include a type of interaction (e.g., a request to adjust volume, lighting, temperature).

At (508), method (500) can include determining a particular location of the user device. For instance, computing system 106 can determine a particular location of user device 102, inside and/or outside building 202. Determining the location of user device 102 can include transmitting a wireless signal, the wireless signal including a GPS signal, a Wi-Fi signal, a cellular signal, an ultra-wide band signal, or combinations thereof. In some implementations, user device 102 can determine its particular location by transmitting and receiving signals from a plurality of beacon devices 108, as described above.

In other implementations, user device 102 can determine its particular location by utilizing Wi-Fi round trip time (RTT) calculations. For instance, user device 102 can initiate a location finding process by sending a signal to a plurality of access points. The access points can send one or more response signals to user device 102. The response signals can include data indicative of a time delay (e.g., processing delay) between when the respective access point received the initiating signal and sent the response signals. User device 102 can calculate the times-of-flight associated with the initiating signals and/or response signals based, at least in part, on the time at which user device 102 sent the initiating signals, the time at which user device 102 received the response signals, and/or the time delay associated with an access point. If user device 102 receives response signals from three or more access devices, user device 102 can apply trilateration techniques to the determined distances and locations to locate itself relative to the access points. For example, user device 102 can determine that it is at a particular location within area 206 (e.g., at a location near couch 310 of the living room). User device 102 can then send data indicative of its particular location to computing system 106. Thus, computing system 106 can determine the location of user device 102 by communicating with user device 102.

At (510), the method (500) can include identifying one or more recommended embedded devices from the plurality of embedded devices. For instance, computing system 106 can identify one or more recommended embedded devices from the plurality of embedded devices 104 based, at least in part, on the particular location of user device 102 and the second sets of data associated with the one or more recommended embedded devices. The one or more recommended embedded devices can include, at least, the recommended embedded device associated with the highest number of interactions with user device 102 for that particular location.

By way of example, computing system 106 can determine that user device 102 is at a particular location within area 206 (e.g., near couch 310 of the living room). Computing system 106 can examine the second sets of data (e.g., heat maps) associated with each embedded devices 104A-E to determine which of the embedded devices are most frequently interacted with when user device 102 is at (e.g., near, in the vicinity of) the particular location within area 206. In one example, computing system 106 can identify embedded device 104A (e.g., a sound system), embedded device 104B (e.g., a thermostat), embedded device 104C (e.g., a foyer lighting system), and/or embedded device 104D (e.g., a television) as recommended devices in the event that embedded devices 104A-D are associated with a high number of interactions with user device 102 while it is at the particular location within area 206. In another example, computing system 106 can determine that a door locking system is a recommended device when user device 102 is located at an area outside of building 202 (e.g., near a door).

Additionally, and/or alternatively, computing system 106 can identify one or more recommended devices based, at least in part, on a threshold. For instance, when user device 102 is at the particular location within area 206, computing system 106 can identify only those of embedded devices 104A-E that have a number of interactions above a threshold number of interactions (e.g., 10, 100, 1000, etc.) with user device 102 while at the particular location, as recommended devices. In some implementations, the threshold can include a number of interactions between user device 102 and embedded devices 104A-E within a given time frame (e.g., within the last day, week, month, etc.).

Additionally, and/or alternatively, computing system 106 can identify one or more recommended embedded devices based on one or more affordances. For instance, the particular location of user device 102 can be associated with one or more affordances. In some implementations, computing system 106 can create one or more affordances for one or more of the locations at which user device 102 interacted with embedded devices 104A-E. The affordances can be based, at least in part, on the second sets of data.

For example, based on the second sets of data (e.g., heat maps) associated with at least embedded devices 104A-D, computing system 106 can determine that embedded device 104A (e.g., a sound system), embedded device 104B (e.g., a thermostat), embedded device 104C (e.g., a foyer lighting system), and/or embedded device 104D (e.g., a television) are associated with a high number of interactions with user device 102 when it is at a location near couch 310 of area 206 (e.g., living room). Thus, computing system 106 can create an affordance for the location near couch 310 of area 206 for interacting with embedded device 104A (e.g., a sound system), another affordance for interacting with embedded device 104B (e.g., a thermostat), another affordance for interacting with embedded device 104C (e.g., a foyer lighting system), and yet another affordance for interacting with embedded device 104D (e.g., a television). When computing system 106 determines that the particular location of user device 102 is at (e.g., near, in the vicinity of) the location near couch 310 of area 206, computing system 106 can identify embedded devices 104A-D as recommended embedded devices based, at least in part, on the affordances for that location.

In some implementations, computing system 106 can create one or more affordances for the particular location of user device 102. By way of example, computing system 106 can determine that user device 102 is at a location near couch 310 of area 206. Based, at least in part, on the second sets of data (e.g., heat maps) associated with embedded devices 104A-D, computing system 106 can determine that embedded devices 104A-D are associated with a high number of interactions with user device 102 when it is at that location. Accordingly, computing system 106 can create one or more affordances for the particular location near couch 310 of area 206 based on the second sets of data. The one or more affordances associated with the particular location can be associated with one or more of embedded devices 104A-D. Computing system 106 can identify embedded devices 104A-D (associated with the affordances) as recommended devices.

At (512), the method (500) can include determining one or more recommended interactions for each recommended embedded device. For instance, computing system 106 can determine one or more recommended interactions for each recommended embedded device 104A-D. The one or more recommended interactions can be based, at least in part, on one or more of the first set of data, the particular location, a presence of another user device, or a time of day.

In one example, computing system 106 can determine that user device 102 typically interacts with recommended embedded device 104E (e.g., a security system) to set an alarm of building 202 when user device 102 is at a particular location within area 218 (e.g., at a location near bed 402 of the bedroom) at night. Thus, computing system 106 can communicate with user device 102 to recommend that user device 102 interact with embedded device 104E (e.g., a security system) to set the alarm when user device 102 is at the particular location at night.

In another example, computing system 106 can determine based, at least in part, on the first sets of data, that when user device 102 is at a particular location within area 206 (e.g., at a location near couch 310 of the living room), user device 102 typically interacts with recommended embedded device 104A (e.g., a sound system) to increase sound volume, with recommended embedded device 104B (e.g., a thermostat) to lower temperature, with embedded device 104E (e.g., a foyer lighting system) to turn off lights, and/or with recommended embedded device 104D (e.g., a television system) to turn on the television. Computing system 106 can determine that these interactions are recommended interactions for the recommended embedded devices 104A, 104B, 104D, and 104E.

In another example, computing system 106 can make a recommendation based, at least in part, on the presence of another user device. For instance, computing system 106 can determine that another user device (e.g., associated with a different user than that of user device 102) is within proximity of user device 102. Computing system 106 can determine that the other user device does not typically interact with embedded device 104D (e.g., a television system). As such, when the other user device (e.g., associated with the user that does not prefer television) is within proximity of user device 102, computing system 106 can make a recommended interaction with embedded device 104D a lower priority, and/or not recommend an interaction with embedded device 104D at all.

At (514), the method (500) can include providing information about at least one or the one or more recommended embedded devices and/or information about at least one of the one or more recommended interactions to the user device. For instance, computing system 106 can provide information about at least one of the one or more recommended embedded devices to user device 102. Computing system 106 can also provide information about at least one of the one or more recommended interactions to user device 102. In some implementations, the information about at least one of the one or more recommended embedded devices can include a list of the one or more recommended embedded devices and/or the one or more recommended interactions. The list can include, at least, the recommended embedded device associated with the highest number of interactions with user device 102 for the particular location.

Figure 7:
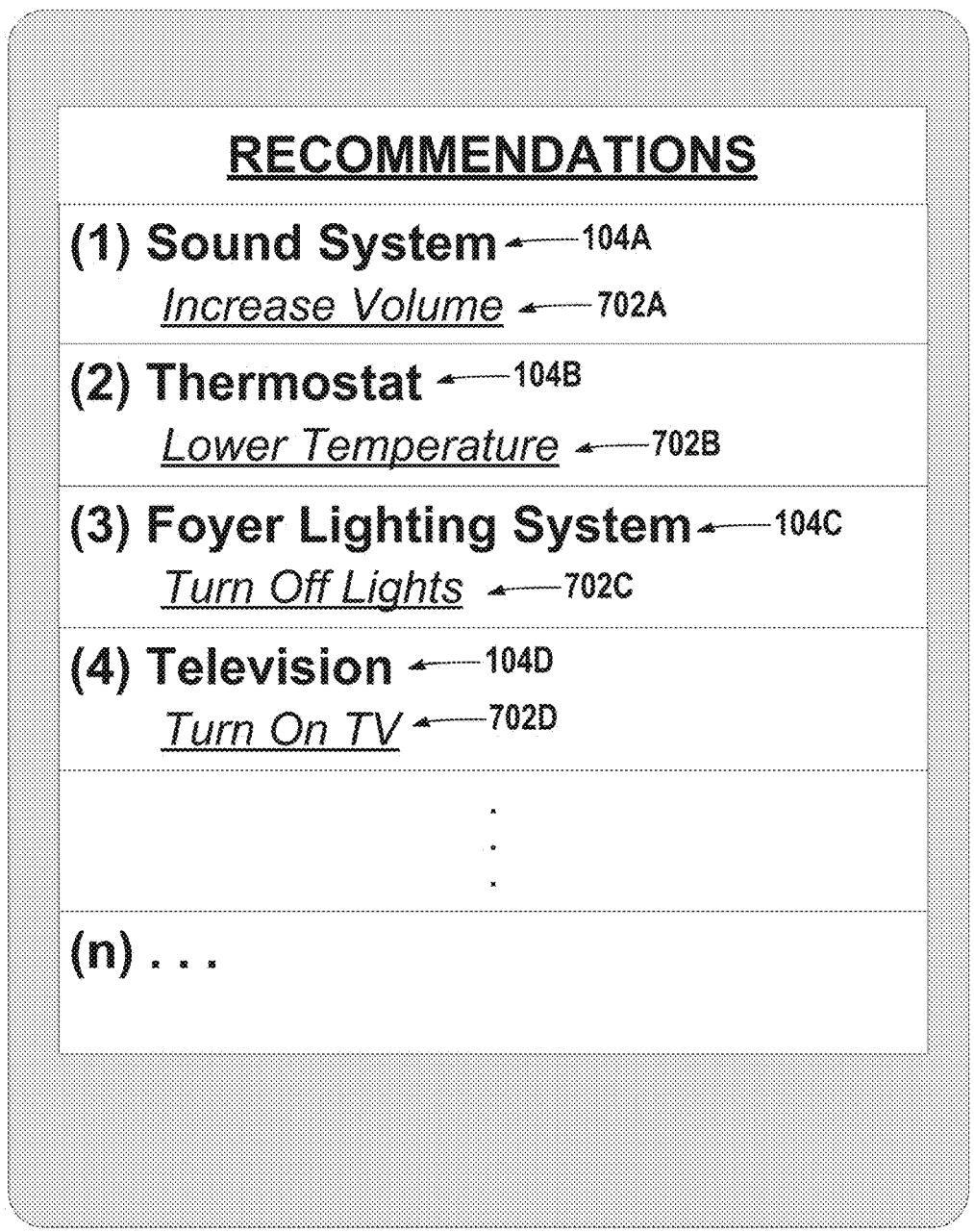
FIG. 7 depicts an example list according to example embodiments of the present disclosure.

For example, FIG. 7 depicts an example list 700 according to example embodiments of the present disclosure. Computing system 106 can provide list 700 to user device 102 such that user device 102 can display (e.g., via an output device) and/or interact with list 700 (e.g., via an input device).

As shown in FIG. 7, list 700 can include the one or more recommended devices 104A-D (e.g., a sound system, thermostat, foyer lighting system, television). In some implementations, list 700 can present the one or more recommended devices 104A-D in order of the number of interactions between recommended devices 104A-D and user device 102. For example, list 700 can present recommended device 104A (e.g., a sound system) first in the event that recommended device 104A is associated with the highest number of interactions with user device 102.

List 700 can include one or more recommended interactions 702A-D for each of the one or more recommended devices 104A-D. For instance, as shown in FIG. 7, embedded device 104A (e.g., a sound system) can be associated with recommended interaction 702A (e.g., to increase volume). Embedded device 104B (e.g., a thermostat) can be associated with recommended interaction 702B (e.g., to lower temperature). Embedded device 104C (e.g., a foyer lighting system) can be associated with recommended interaction 702C (e.g., to turn off lights). Embedded device 104D (e.g., a television) can be associated with recommended interaction 702D (e.g., to turn on the television).

In some implementations, recommended embedded devices 104A-D and/or recommended interactions 702A-D can be presented in an order based, at least in part, on a score associated with each respective recommended embedded devices 104A-D and/or recommended interactions 702A-D. For instance, recommended embedded devices 104A-D and/or recommended interactions 702A-D can each be associated with a score that can be based, at least in part, on a number (and/or type) of past interactions between user device 102 and recommended embedded devices 104A-D, the presence of another user device, a time of day, etc. List 700 can present the recommended embedded devices 104A-D in the order based on the scores (e.g., highest to the lowest). For instance, as shown in FIG. 7, embedded device 104A can be associated with the highest score. The orientation of list 700 and the number(s) of recommended devices and/or recommended interactions shown in list 700 are depicted for purposes of illustration and discussion only and are not intended to be limiting.

In some implementations, after receiving the one or more recommended embedded devices and/or recommended interactions, a user of user device 102 can interact with one or more embedded devices via user device 102. For example, user device 102 can display the list 700 via a user interface and allow a user to interact with the recommended embedded devices 104A-D to implement a recommended interaction 702A-D. A user can interact (e.g., via an input device of user device 102) with textual components and/or graphical elements associated with list 700 to cause user device 102 to communicate with embedded devices 104A-D to complete the recommended interactions 702A-D. In other implementations, computing system 106 and/or user device 102 can automatically implement a recommended interaction without user input.

Figure 8:
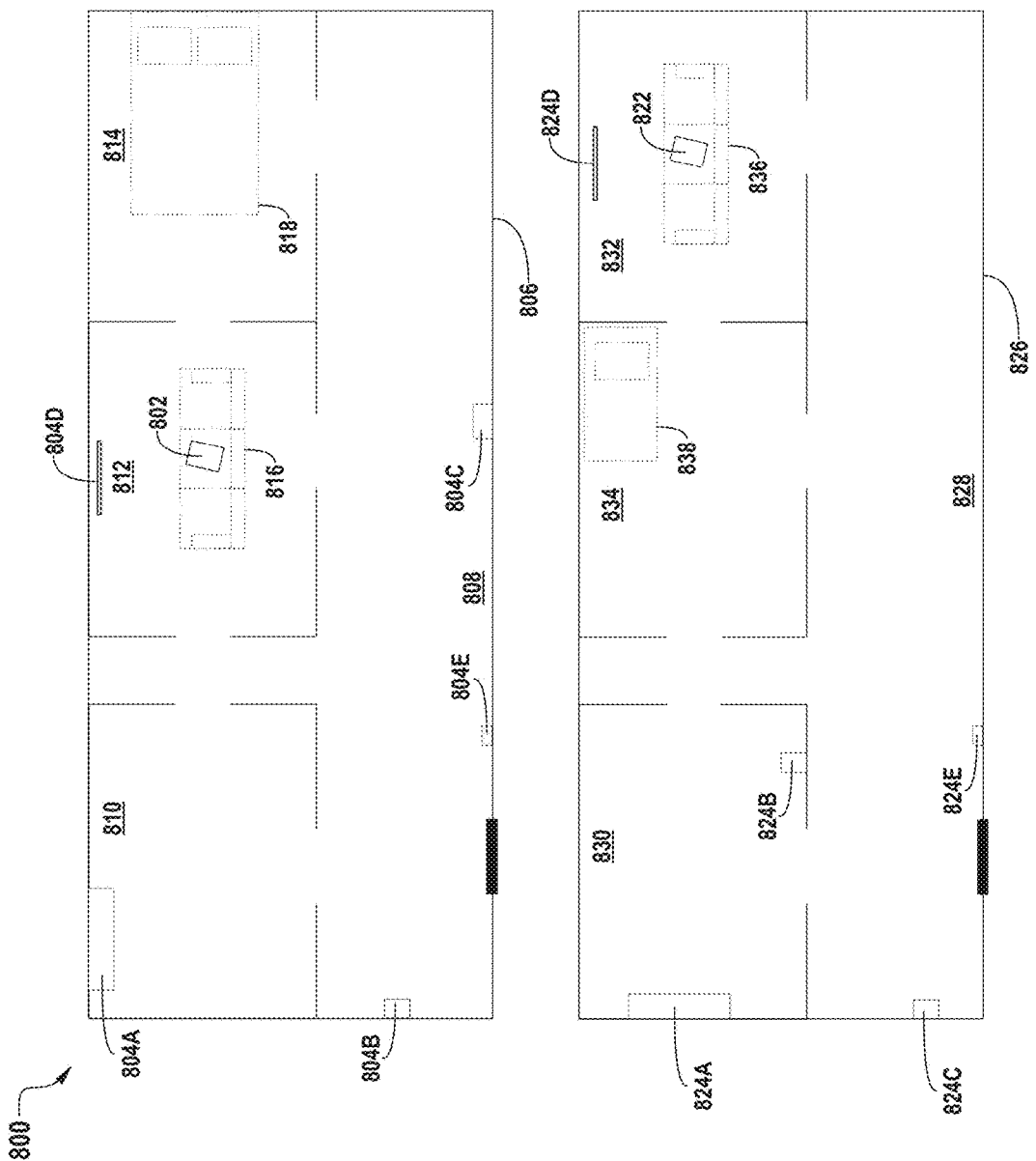
FIG. 8 depicts an example system according to example embodiments of the present disclosure.

FIG. 8 depicts an example system 800 according to example embodiments of the present disclosure. System 800 includes a first user device 802 and a plurality of first embedded devices 804A-E associated with a first building 806. System 800 can also include a second user device 822 and a plurality of second embedded devices 824A-E associated with a second building 826. In some implementations, second user device 822 can be associated with a different user and/or household than user device 802. In other implementations, second user device 822 can be associated with the same user and/or household as first user device 802, System 800 can also include computing system 106 (not shown), which can be configured to communicate with first user device 802, second user device 822, first embedded devices 804A-E, and/or second embedded devices 824A-E.

As shown in FIG. 8, first building 806 can include a plurality of areas 808, 810, 812, and 814. The plurality of first embedded devices 804A-E can be located within areas 808, 810, 812, 814 of first building 806 and/or located on the outside of first building 806. In one example implementation, first embedded device 804A can be located within area 814 and can be associated with a sound system. First embedded device 804B can be located in area 808 and can be associated with a thermostat. First embedded devices 804C and 804E can be located in area 808 and can be associated with a lighting system and a security system, respectively. First embedded device 804D can be located in area 812 and can be associated with a television.

Computing system 106 can be configured to determine one or more semantic locations (e.g., den, foyer, living room, bedroom, etc.) associated with the first building. In some implementations, computing system 106 can determine the semantic locations by communicating with one or more embedded devices.

For example, when first embedded devices 804A-E are installed in building 802, an installer can identify a semantic location associated with the respective embedded device. For example, when first embedded device 804A (e.g., a sound system) is installed within area 810, the installer can identify that first embedded device 804A is associated with a den by selecting from a dropdown menu of semantic locations, manually inputting the semantic location, etc. First embedded device 804A can store the semantic locations in a memory device and/or communicate the semantic locations to computing system 106. Thus, by communicating with embedded devices 804A, computing system 106 can determine that the semantic location of area 810 is associated with a den.

In some implementations, the semantic location of an area can be determined based, at least in part, on the type of embedded device. In one example, computing system 106 can determine that a security system 804E is most likely associated with an area of building 806 that is a foyer such that it can be activated and/or deactivated upon exit and entry into building 806. Thus, computing system 106 can determine that the semantic location of area 808 is likely a foyer. In another example, computing system 106 can determine that embedded device 804D (e.g., a television) is most likely associated with an area of building 806 that is a living room. Thus, computing system 106 can determine that the semantic location of area 812 is likely a living room.

As shown in FIG. 8, second building 826 can include a plurality of areas 828, 230, 832, and 834. The plurality of second embedded devices 824A-E can be located within areas 828, 830, 832, 834 of second building 828 and/or located on the outside of second building 826. Second embedded devices 824A (e.g., a sound system) and 824B (e.g., a thermostat) can be located within area 830 (e.g., a den). Second embedded devices 824C (e.g., a lighting system) and 824E (e.g., a security system) can be located in area 828 (e.g., a foyer). Second embedded device 824D (e.g., a television) can be located in area 832 (e.g., a living room). The number(s) and locations of user devices, embedded devices, areas, and/or buildings depicted in FIG. 8 are for purposes of illustration and discussion only and are not intended to be limiting.

Figure 9:
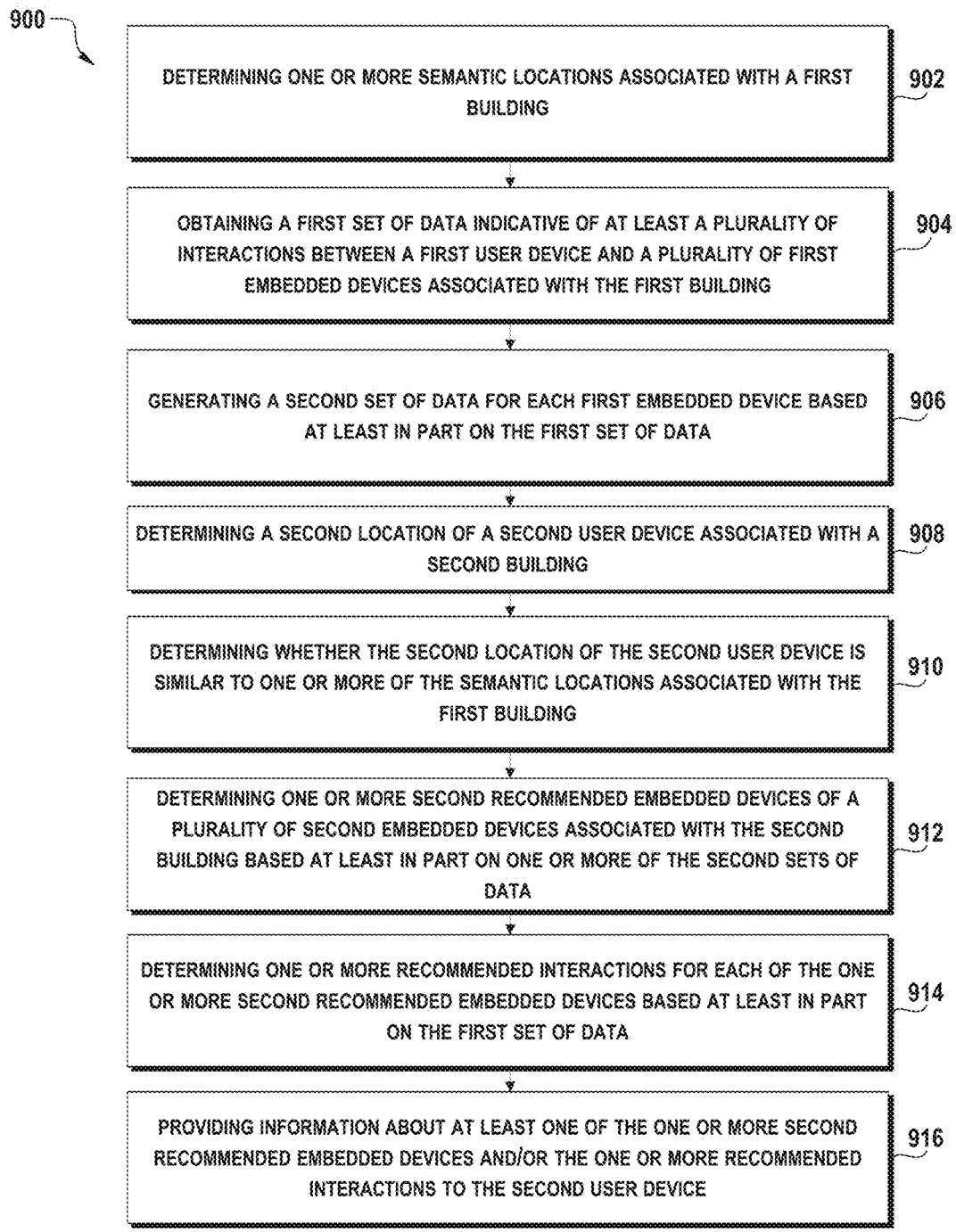
FIG. 9 depicts a flow diagram of an example method of facilitating interactions with embedded devices according to example embodiments of the present disclosure.

FIG. 9 depicts a flow diagram of an example method (900) of facilitating interactions with embedded devices according to example embodiments of the present disclosure. Method (900) can be implemented by one or more computing devices, such as the one or more computing devices of computing system 106. In addition, FIG. 9 depicts steps performed in a particular order for purposes of illustration and discussion. The steps of any of the methods discussed herein can be adapted, rearranged, expanded, omitted, or modified in various ways without deviating from the scope of the present disclosure.

At (902), the method (900) can include determining one or more semantic locations associated with a first building. For instance, computing system 106 can determine one or more semantic locations associated with first building 806. As described above with respect to FIG. 8, computing system 106 can determine the one or more semantic locations (e.g., den, foyer, living room, bedroom) by communicating with embedded devices 804A-E associated with first building 806 and/or based on the type of embedded device.

At (904), the method (900) can include obtaining a first set of data indicative of at least a plurality of interactions between a first user device and a plurality of first embedded devices associated with the first building. For instance, computing system 106 can obtain a first set of data indicative of at least a plurality of interactions between first user device 802 and a plurality of first embedded devices 804A-E associated with first building 806, in a manner similar to that described above with reference to FIG. 5. The plurality of interactions between first user device 802 and the plurality of first embedded devices 804A-E can occur while first user device 802 is associated with one or more of the semantic locations (e.g., den, foyer, living room, bedroom) of first building 806.

At (906), the method (900) can include generating a second set of data for each first embedded device based, at least in part, on the first set of data. For instance, computing system 106 can generate a second set of data for each first embedded device 804A-E based, at least in part, on the first set of data, in a manner similar to that described above with reference to FIG. 5. Each second set of data can be indicative of at least a number of interactions between first user device 802 and the respective first embedded device 804A-E, for each of the one or more semantic locations. For example, computing system 106 can generate a heat map associated with embedded device 804A (e.g., a sound system). The heat map can be indicative of a number of interactions between first user device 802 and embedded device 804A when first user device is located at one or more semantic locations (e.g., den, foyer, living room, bedroom) of first building 806.

At (908), the method (900) can include determining a second location of a second user device associated with a second building. For instance, computing system 106 can determine a location of second user device 822 associated with second building 826, in a manner similar to that described above. In one example, computing system 106 can determine that user device 822 is at a particular location within area 832 (e.g., at a location near couch 836 of a living room).

At (910), the method (900) can include determining whether the second location of the second user device is similar to one or more of the semantic locations associated with the first building. For instance, computing system 106 can determine whether the location of second user device 822 is similar to one or more of the semantic locations (e.g., den, foyer, living room, bedroom) associated with first building 806.

By way of example, computing system 106 can determine that the location of second user device 822 is at a particular location within area 832. Computing system 106 can determine that area 832 is associated with a living room, in a manner similar to that described above with reference to FIG. 8. Thus, computing system 106 can determine that the location of second user device 822 is similar to a semantic location (e.g., a living room, area 812) of first building 806.

At (912), the method (900) can include determining one or more second recommended embedded devices of a plurality of second embedded devices associated with the second building based, at least in part, on one or more of the second sets of data. For instance, when the location of user device 822 is similar to one or more semantic locations associated with first building 806, computing system 106 can identify recommended embedded devices associated with second building 826 for second user device 822.

In some implementations, computing system 106 can identify one or more second recommended embedded devices associated with second building 826 based, at least in part, on one or more first recommended devices associated with first building 806. For instance, computing system 106 can identify one or more first recommended devices for one or more semantic locations of first building 806. The one or more first recommended devices can be identified based, at least in part, on the second sets of data associated with the first recommended embedded devices. For example, based on the heat maps associated with embedded devices 804A-D, computing system 106 can identify embedded devices 804A-D as first recommended devices for the living room (e.g., area 812) of first building 806. Computing system 106 can then identify which of the second embedded devices 824A-E are similar in type to the first recommended embedded devices 804A-D. Accordingly, computing system 106 can identify second embedded devices 824A-D as recommended embedded devices when second user device is located within area 832 (e.g., a living room) of second building 826.

Moreover, computing system 106 can determine, for each of the one or more second recommended devices 824A-D, a probability of interaction with second user device 822 based, at least in part, on the second sets of data. For example, based on the number of interactions between the first recommended embedded device 804A (e.g., a sound system) and first user device 802, computing system 106 can determine a probability of interaction between the corresponding second recommended embedded device 824A (e.g., a sound system) and second user device 822.

At (914), the method (900) can include determining one or more recommended interactions for each of the one or more second recommended embedded devices based, at least in part, on the first set of data. For instance, computing system 106 can determine one or more recommended interactions for each of the second recommended embedded devices 824A-D. Such determination can be based, at least in part, on the first set of data associated with first embedded devices 804A-D. For example, the first set of data can indicate typical types of interactions (e.g., increasing volume) between first user device 802 and first embedded device 804A (e.g., a sound system) when first user device 802 is in the living room. Based on such data, computing system 106 can recommend an interaction (e.g., increasing volume) between second user device 822 and second recommended embedded device 824A, when second user device 822 is within area 832 (e.g., a living room) of second building 826.

At (916), the method (900) can include providing information about at least one of the one or more second recommended embedded devices and/or the one or more recommended interactions to the second user device. For instance, computing system 106 can provide information about at least one of the one or more second recommended embedded devices 824A-D to second user device 822. Moreover, computing system 106 can provide information about at least one of the one or more recommended interactions to second user device 822. For example, computing system 106 can provide such information to second user device 822 via a network (e.g., WiFi, LTE). In the case that second user device 822 is associated with a different person and/or household from first user device 802, the information provided by computing system 106 can be anonymous.

For example, computing system 106 can provide a list to second user device 822 similar to that of list 700. The second recommended embedded devices 824A-D can be presented in order of the probability of interaction associated with each second recommended embedded device 824A-D. In some implementations, a user of second user device 822 can utilize the list to interact with one or more of the second recommended embedded devices 824A-D, in a manner to that similarly described above.

While method (900) describes computing system 106 as recommending embedded devices to second user device 822 based, at least in part, on the interactions of first user device 802, the method is not so limited. In some implementations, computing system 106 can recommend embedded devices to second user device 822 based on the interactions of a plurality of user device, each within a separate building, and each building associated with a separate plurality of embedded devices. For example, in some implementations, first user device 802 can be one of a plurality of user devices and building 806 can be one of a plurality of buildings. In such a case, computing system 106 can determine one or more semantic locations for each of the plurality of buildings (including building 806).

The first set of data can be indicative of a plurality of interactions between a plurality of user devices (located in a plurality of buildings) and the embedded devices associated with each of those buildings. Computing system 106 can group the interactions based on the semantic locations. For example, all interactions taking place in the living rooms of each building can be grouped together. In this way, the first set of data can be indicative of user device-embedded device interactions across a plurality of buildings (that can include first building 806). The second sets of data can be indicative of a number of interactions between the plurality of user devices and the respective embedded devices for each semantic location. Computing system 106 can use these broader sets of data to recommend embedded devices and/or interactions to second user device 822.

For example, computing system 106 can create one or more affordances for a semantic location, such as a living room. One an affordance can be associated with interacting with a sound system, when it is determined (based on the broader sets of data) that user devices generally interact with sound systems when a user device is in a living room. Thus, when computing system 106 determines that second user device 822 is located at a particular location within area 832 (e.g., a living room), computing system 106 can (based on the broader data sets) recommend that second user device 822 interact with embedded device 824A (e.g., a sound system of building 826).

Figure 10:
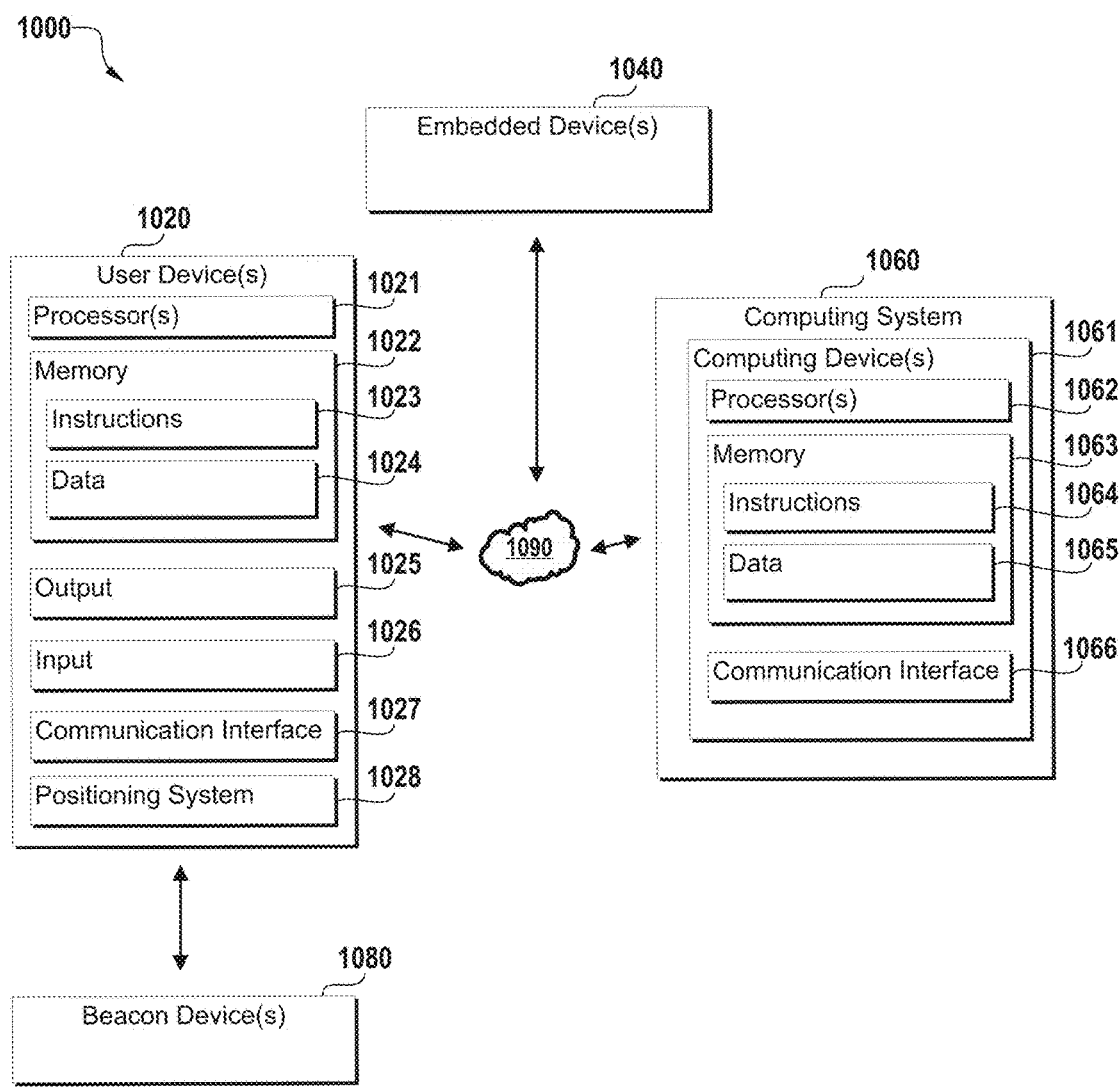
FIG. 10 depicts an example system according to example embodiments of the present disclosure.

FIG. 10 depicts an example system 1000 that can be used to implement the methods and systems of facilitating interactions with embedded devices according to example aspects of the present disclosure. System 1000 can include user device 1020, a plurality of embedded devices 1040, and computing system 1060. In some implementations, system 1000 can include beacon devices 1080. User device 1020 can, for instance, correspond to user device 102 as described herein. Embedded devices 1040 can, for instance, correspond to embedded devices 104 as described herein. Computing system 1060 can, for instance, correspond to computing system 106 as described herein. Beacon device(s) 1080 can, for instance, correspond to beacon devices 108 as described herein.

User device 1020 can include one or more processor(s) 1021 and one or more memory devices 1022. The one or more processor(s) 1021 can include any suitable processing device, such as a microprocessor, microcontroller, integrated circuit, logic device, one or more central processing units (CPUs), graphics processing units (GPUs) dedicated to efficiently rendering images or performing other specialized calculations, and/or other processing devices, such as a system on a chip (SoC) or a SoC with an integrated RF transceiver. The one or more memory devices 1022 can include one or more computer-readable media, including, but not limited to, non-transitory computer-readable media, RAM, ROM, hard drives, flash memory, or other memory devices.

The one or more memory devices 1022 can store information accessible by the one or more processors 1021, including instructions 1023 that can be executed by the one or more processors 1021. For instance, the memory devices 1022 can store instructions 1023 for implementing a location determining process, a broadcast process (e.g., to send ultrasonic signals), a scan process (e.g., to scan for and detect signals from beacon devices 1080), a process to interact with embedded devices 1040 and/or computing system 1060, any capabilities of user device 102 as described herein, and/or various aspects of any of the systems and/or methods disclosed herein.

The one or more memory devices 1022 can also include data 1024 that can be retrieved, manipulated, created, or stored by the one or more processors 1021. The data can include, for instance, information associated with a particular location of user device 1020, information associated with one or more embedded devices 1040, information associated with beacon devices 1080 and/or information associated with one or more signals sent and/or received by user device 1020 (e.g., transmission times, receipt times, signal speeds).

User device 1020 can include various input/output components for providing and receiving information. Output component 1025, in some examples, can be configured to provide output to a user using tactile, audio, or video stimuli. Output component 1025, in one example, can include an electronic display, a loudspeaker, or any other type of device for converting a signal into an appropriate form understandable to humans or machines. The electronic display can be an LCD or OLED part of a touch screen, can be a non-touchscreen direct view display component such as a CRT, LED, LCD, or OLED. The display component can also be a projector instead of a direct view display. Output component 1025 can also include a structure capable of outputting a radio signal (e.g., radio output component) and/or a structure capable of outputting an ultrasonic pulse (e.g., ultrasonic output component). For instance, the radio output component can comprise an RF modulator, an RF transmitter, a radio antenna (either external or internal), a signal generator, or a radio amplifier, among other things. Further, the ultrasonic output component can include an ultrasonic transponder, an ultrasonic transducer, an ultrasonic sensor, or an ultrasonic transmitter, among other things. In some implementations, the ultrasonic output component can be a speaker, such as is found in commonly available smartphones and/or other personal mobile computing devices.

Input components 1026, in some examples, can be configured to receive input from a user through tactile, audio, or video feedback. Examples of input components 1026 can include a display component, a mouse, a keyboard, a camera, a microphone or any other type of device for detecting input from a user. In some examples, a display component includes a touch-sensitive screen. Input component 1026 can also include a structure capable of receiving a radio frequency signal (e.g., Bluetooth low energy packets). For instance, input component 1026 can include a radio antenna, a radio receiver, a communication receiver, or a scanner, among other things.

User device 1020 can further include a communication interface 1027. Communication interface 1027 can be used to communicate with another device, such as embedded devices 1040, computing system 1060, and/or beacon device(s) 1080, via one or more wired and/or wireless networks by transmitting and/or receiving network signals on one or more networks. Communication interface 1027 can include a network interface, network interface card, such as an Ethernet card, an optical transceiver, a radio frequency transceiver, or any other type of device that can send and/or receive information. Examples of such network interfaces can include Bluetooth, infrared signaling, 3G, LTE, and Wi-Fi radios as well as Universal Serial Bus (USB) and Ethernet. A network interface can include any suitable components for interfacing with one more networks, including for example, transmitters, receivers, ports, controllers, antennas, or other suitable components. In some examples, user device 1020 can utilize communication interface 1027 to wirelessly communicate with another computing device that is operably coupled to user device 1020.

User device 1020 can further include positioning system 1028. Positioning system 1028 can be any device or circuitry for determining the position of user device 1020. For example, the positioning system 1028 can determine actual or relative position by using a satellite navigation positioning system (e.g. a GPS system, a Galileo positioning system, the GLObal Navigation satellite system (GLONASS), the BeiDou Satellite Navigation and Positioning system), an inertial navigation system, a dead reckoning system, based on IP address, by using trilateration and/or proximity to cellular towers or Wi-Fi hotspots, Wi-Fi time-of-flight, and/or other suitable techniques for determining position.

Computing system 1060 can include one or more computing device(s) 1061. The one or more computing device(s) 1061 can include one or more processor(s) 1062 and one or more memory device(s) 1063. The one or more processor(s) 1062 can include any suitable processing device, such as a microprocessor, microcontroller, integrated circuit, logic device, one or more central processing units (CPUs), graphics processing units (GPUs) dedicated to efficiently rendering images or performing other specialized calculations, and/or other processing devices. The one or more memory devices 1063 can include one or more computer-readable media, including, but not limited to, non-transitory computer-readable media, RAM, ROM, hard drives, flash drives, or other memory devices. In some examples, memory devices 1063 can correspond to coordinated databases that are split over multiple locations.

The one or more memory device(s) 1063 can store computer-readable instructions 1064 that when executed by the one or more processor(s) 1062 cause the one or more processor(s) 1062 to perform operations, such as the operations for facilitating interactions with embedded devices as described herein, and/or any other operations or functions of computing system 106 or for which computing system 106 is configured. The memory device(s) 1063 can further store data 1065. The data 1065 can also include data associated with user device 1060 (e.g., the location of user device 1020), data associated with embedded devices 1040 (e.g., the location, function, type, etc.), first sets data associated with the interactions between user device 1020 and embedded devices 1040, second sets of data (e.g., heat maps), one or more recommended embedded devices for a location, one or more affordances associated with a location, recommended interactions for recommended embedded devices, semantic locations, etc.

The computing device(s) 1061 can also include a communication interface 1066 used to communicate, for example, with the other components of system 1000 over network 1090 (e.g., a wired or wireless network). Communication interface 1066 can include any suitable components for interfacing with one or more network(s), including for example, transmitters, receivers, ports, controllers, antennas, or other suitable components.

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein can be implemented using a single server or multiple servers working in combination. Databases and applications can be implemented on a single system or distributed across multiple systems. Distributed components can operate sequentially or in parallel.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method of facilitating interactions with embedded devices, the method comprising:

obtaining, by one or more computing devices, a first set of data indicative of a plurality of past interactions between a user device and a plurality of embedded devices associated with a building, wherein, for each of the plurality of past interactions, the first set of data is indicative of one or more locations of the user device, an embedded device with which the user device interacted, and a type-of-interaction associated with the embedded device with which the user interacted;

generating, by the one or more computing devices, a second set of data for each embedded device of the plurality of embedded devices based at least in part on the first set of data, wherein each second set of data is indicative of at least a number of interactions between the user device and the respective embedded device for each of the one or more locations;

determining, by the one or more computing devices, a particular location of the user device;

identifying, by the one or more computing devices, at least one recommended embedded device from the plurality of embedded devices based at least in part on the particular location of the user device and the second set of data associated with the at least one recommended embedded device;

determining, by the one or more computing devices, a recommended interaction associated with the at least one recommended embedded device based at least in part on the particular location of the user device and a type-of-interaction of a past interaction with the at least one recommended embedded device; and providing, by the one or more computing devices, information about the at least one recommended embedded device and the recommended interaction associated with the at least one recommended embedded device to the user device.

2. The computer-implemented method of claim 1, wherein each second set of data comprises a heat map indicative of the number of interactions between the user device and the respective embedded device for each of the one or more locations relative to the other one or more locations, wherein the number of interactions comprises a number of one or more past interactions between the user device and the respective embedded device.

3. The computer-implemented method of claim 2, wherein the at least one recommended embedded device is associated with the highest number of interactions with the user device for the particular location.

4. The computer-implemented method of claim 2, wherein the information about the at least one recommended embedded device is included in a list of a plurality of recommended embedded devices, wherein the list includes the at least one recommended embedded device that is associated with a highest number of interactions with the user device for the particular location, and wherein the list is ordered based at least in part on a score associated with each of the plurality of recommended embedded devices.

5. The computer-implemented method of claim 1, wherein the recommended interaction is based at least in part on one or more of a presence of another user device or a time of day.

6. The computer-implemented method of claim 1, wherein the second set of data is based at least in part on one or more of a time of day, a day of week, or weather.

7. The computer-implemented method of claim 1, wherein the particular location is associated with one or more affordances, wherein the one or more affordances are based at least in part on the second sets of data and wherein each of the one or more affordances are associated with one or more of the embedded devices.

8. The computer-implemented method of claim 7, wherein identifying, by the one or more computing devices, the at least one recommended embedded device from the plurality of embedded devices comprises:

identifying, by the one or more computing devices, the at least one recommended embedded device based at least in part on the one or more affordances.

9. The computer-implemented method of claim 1, wherein determining, by the one or more computing devices, the particular location of the user device comprises transmitting a wireless signal, the wireless signal comprising a GPS signal, a Wi-Fi signal, a cellular signal, an ultra-wide band signal, or combinations thereof.

10. A computing system for facilitating interactions with embedded devices, comprising:
   one or more processors; and
   one or more memory devices, the one or more memory devices storing computer-readable instructions that when executed by the one or more processors cause the one or more processors to perform operations, the operations comprising:
      obtaining a first set of data indicative of a plurality of past interactions between a user device and a plurality of embedded devices associated with a building wherein, for each of the plurality of past interactions, the first set of data is indicative of one or more locations of the user device, an embedded device with which the user device interacted, and a type-of-interaction associated with the embedded device with which the user interacted;
      generating a second set of data for each embedded device of the plurality of embedded devices based at least in part on the first set of data, wherein each second set of data is indicative of at least a number of interactions between the user device and the respective embedded device for the one or more locations;
      creating one or more affordances for one or more of the locations based at least in part on the second sets of data, wherein each affordance is associated with at least one of the one or more embedded devices;
      determining a particular location of the user device;
      identifying at least one recommended embedded device from the plurality of embedded devices based at least in part on the particular location of the user device and the one or more affordances;
      determining a recommended interaction associated with the at least one recommended embedded device based at least in part on the particular location of the user device and a type-of-interaction of a past interaction with the at least one recommended embedded device; and
      providing information about the at least one recommended embedded device and the recommended interaction associated with the at least one recommended embedded device to the user device.

11. The computing system of claim 10, wherein each second set of data comprises a heat map indicative of a number of interactions between the user device and the respective embedded device for each of the one or more locations relative to the other one or more locations.

12. The computing system of claim 11, wherein the at least one recommended embedded device is associated with a highest number of interactions with the user device for the particular location.

13. The computing system of claim 10, wherein the recommended interaction is based at least in part on one or more of a presence of another user device or a time of day.

14. The computing system of claim 10, wherein the particular location is in the vicinity of one or more of the locations.

15. A computer-implemented method of facilitating interactions with embedded devices, the method comprising:
   determining, by the one or more computing devices, one or more semantic locations associated with a first building;
   obtaining, by the one or more computing devices, a first set of data indicative of at least a plurality of interactions between a first user device and a plurality of first embedded devices associated with the first building, wherein the plurality of interactions occur while the first user device is associated with one or more of the semantic locations;
   generating, by the one or more computing devices, a second set of data for each first embedded device based at least in part on the first set of data, wherein each second set of data is indicative of at least a number of interactions between the first user device and the respective first embedded device for one or more of the semantic locations;
   determining, by the one or more computing devices, a second location of a second user device associated with a second building;
   determining, by the one or more computing devices, whether the second location of the second user device is similar to one or more of the semantic locations associated with the first building;
   when the second location is similar to one or more of the semantic locations associated with the first building,
      determining, by the one or more computing devices, one or more second recommended embedded devices of a plurality of second embedded devices associated with the second building based at least in part on one or more of the second sets of data; and
      providing, by the one or more computing devices, information about at least one of the one or more second recommended embedded devices to the second user device.

16. The computer-implemented method of claim 15, wherein determining, by the one or more computing devices, the one or more second recommended embedded devices associated with the second building comprises:
   determining, by the one or more computing devices, for each of the one or more second recommended devices, a probability of interaction between the second user device and the respective second recommended device based at least in part on the second sets of data.

17. The computer-implemented method of claim 16, wherein the information about at least one of the one or more second recommended embedded devices indicates the one or more second recommended embedded devices in order of the probability of interaction associated with each second recommended embedded device.

18. The computer-implemented method of claim 15, further comprising:
   determining, by the one or more computing devices, one or more recommended interactions for each of the one or more second recommended embedded devices based at least in part on the first set of data; and
   providing, by the one or more computing devices, information about at least one of the one or more recommended interactions to the second user device.

19. The computer-implemented method of claim 15, wherein determining, by the one or more computing devices, the one or more second recommended embedded devices of the plurality of second embedded devices comprises:
- identifying, by the one or more computing devices, one or more first recommended embedded devices from the plurality of first embedded devices for one or more of the semantic locations based at least in part on the second sets of data associated with the one or more first recommended embedded devices; and
- determining, by the one or more computing devices, the one or more second recommended embedded devices based at least in part on the one or more first recommended embedded devices, wherein the one or more second recommended embedded devices are similar in type to the one or more first recommended embedded devices.

* * * * *